US011253956B2

(12) United States Patent
Griffith et al.

(10) Patent No.: US 11,253,956 B2
(45) Date of Patent: *Feb. 22, 2022

(54) STRUCTURE HAVING STRESS PROTECTED GROOVE WELD AND STRUCTURAL MEMBERS FORMING THE SAME

(71) Applicant: Caterpillar Inc., Peoria, IL (US)

(72) Inventors: David R. Griffith, Peoria, IL (US); Michael Noble, Peoria, IL (US); William Ulrich, East Peoria, IL (US); Christopher Lu, Peoria, IL (US); Ling Pan, Peoria, IL (US); Huijun Wang, Peoria, IL (US); Donald Stickel, Chillicothe, IL (US); Keith Egland, Peoria, IL (US); Jeremy R. Hammar, Metamora, IL (US); Seth Johnson, Dunlap, IL (US); Timothy W. Olmsted, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 88 days.

This patent is subject to a terminal disclaimer.

(21) Appl. No.: 16/839,644

(22) Filed: Apr. 3, 2020

(65) Prior Publication Data

US 2020/0230749 A1 Jul. 23, 2020

Related U.S. Application Data

(63) Continuation of application No. 15/377,026, filed on Dec. 13, 2016, now Pat. No. 10,688,600.

(51) Int. Cl.
*B23K 33/00* (2006.01)
*B23K 31/00* (2006.01)

(52) U.S. Cl.
CPC .......... *B23K 33/004* (2013.01); *B23K 31/003* (2013.01)

(58) Field of Classification Search
CPC .... B23K 33/00; B23K 33/002; B23K 33/004; B23K 33/006
See application file for complete search history.

(56) References Cited

U.S. PATENT DOCUMENTS

| 1,496,936 A | 6/1924 | Lowe |
| 1,790,738 A | 2/1931 | Andren |

(Continued)

FOREIGN PATENT DOCUMENTS

| CN | 104759743 | 4/2015 |
| CN | 105234577 | 1/2016 |

(Continued)

*Primary Examiner* — Daniel J Wiley
(74) *Attorney, Agent, or Firm* — Xsensus LLC

(57) ABSTRACT

A structural member includes a body having a first surface, a second surface, and an end surface at an end portion of the structural member. The end portion of the structural member includes a root protrusion extending radially outward from the second surface of the structural member along a root protrusion radius to an outer end of the root protrusion to define a root protrusion height extending from the second surface of the structural member to the outer end of the root protrusion. The root protrusion further includes a root protrusion width extending between an inner edge and an outer edge of the outer end of the root protrusion. The root protrusion radius, the root protrusion height, and the root protrusion width are configured to define a stress protected weld root region isolated beyond and away from a root stress flow path propagated through the body of the structural member.

18 Claims, 21 Drawing Sheets

(56) References Cited

U.S. PATENT DOCUMENTS

| | | |
|---|---|---|
| 2,288,433 A | 6/1942 | Boetcher |
| 2,350,716 A | 6/1944 | Bissout |
| 2,415,987 A | 2/1947 | Bissout |
| 2,463,061 A | 11/1948 | Bissout et al. |
| 2,945,942 A | 7/1960 | Flynn et al. |
| 4,000,952 A | 1/1977 | Bryan et al. |
| 5,148,966 A | 9/1992 | Minase et al. |
| 5,532,454 A | 7/1996 | Kuhnen |
| 6,386,427 B2 | 5/2002 | Iwago et al. |
| 7,374,823 B2 | 5/2008 | Maruyama et al. |
| 7,481,350 B1 | 1/2009 | Shah |
| 8,653,403 B2 | 2/2014 | Honma et al. |
| 9,592,733 B2 | 3/2017 | Lyle et al. |

FOREIGN PATENT DOCUMENTS

| | | |
|---|---|---|
| DE | 339453 C | 7/1921 |
| DE | 102016003190 A1 | 8/2016 |
| EP | 2845953 | 3/2017 |
| GB | 656696 | 8/1951 |
| JP | S58151968 | 9/1983 |
| JP | 2001087811 | 9/1999 |
| JP | 2001123471 | 5/2001 |
| JP | 3428592 | 7/2003 |
| JP | 2007229777 | 9/2007 |
| JP | 2016182634 | 10/2016 |
| JP | 2019530443 A | 10/2019 |
| KR | 1020130113825 | 10/2013 |
| SU | 1274888 A1 | 12/1986 |
| WO | 2015112978 | 7/2015 |
| WO | 2016129690 | 8/2016 |

STRUCTURE HAVING STRESS PROTECTED GROOVE WELD AND STRUCTURAL MEMBERS FORMING THE SAME

CROSS-REFERENCE TO RELATED APPLICATIONS

This application is a continuation of U.S. patent application Ser. No. 15/377,026, filed on Dec. 13, 2016, the entire contents of which are incorporated herein by reference.

TECHNICAL FIELD

The present disclosure generally relates to stress protected groove welds and, more particularly, relates to structural members which form structures having stress protected groove welds.

BACKGROUND

Groove welds may be used to join structural members to form one or more weldments of a wide variety of numerous different types of structures. In particular, groove welds may be a means by which two structural members or other metal components are joined together by the affixation of adjacent and/or mating edges or surfaces as a result of a mutual thermal bonding transformation therebetween which may be provided, at least in part, by heated filler material. At least a part of the interior of the groove weld may be composed of the filler material which may engage and thermally bond with the adjacent surfaces and edges of the pre-existing parent material of the structural members or other metal components, including at a top portion, or "toe", and at a bottom, or "root" portion of the groove weld and the structural members.

While groove welds may be widely used as an effective means by which structural members are joined to form a wide variety of numerous different types of structures, typical, conventional groove welds may be subsequently susceptible to fatigue or failure. For example, the welded structure may be subject to cyclic loading, forces and/or stresses, which may include, in part, tensile or bending forces that produce stresses on the weld and structural members. When loading, forces, and/or stresses are applied to the structure and the groove weld, portions of the groove weld, such as the root and/or toe thereof, may be incapable of absorbing and withstanding loading, forces, and/or stresses applied thereto, and thus may be particularly susceptible to fatigue or failure.

U.S. Pat. No. 7,374,823, and entitled "Welding Portion Constitution and Welding Method," discloses a weld assembly including first and second members having inclined portions that are joined by a weld bead. However, the failure of groove weld joints continues to be problematic in the field because the weld root and/or the weld toe remains subject to high stresses.

The present disclosure is directed at addressing one or more of the deficiencies and disadvantages set forth above.

SUMMARY OF THE DISCLOSURE

In one aspect of the present disclosure, a structural member is disclosed. The structural member includes a body having a first surface, a second surface, and an end surface at an end portion of the structural member. The end portion of the structural member includes a root protrusion extending radially outward from the second surface of the structural member along a root protrusion radius to an outer end of the root protrusion to define a root protrusion height extending from the second surface of the structural member to the outer end of the root protrusion. The root protrusion further includes a root protrusion width extending between an inner edge and an outer edge of the outer end of the root protrusion. The root protrusion radius, the root protrusion height, and the root protrusion width are configured to define a stress protected weld root region isolated beyond and away from a root stress flow path propagated through the body of the structural member.

In another aspect of the present disclosure, a structure is disclosed. The structure includes at least two structural members joined by at least one groove weld. The at least two individual structural members include a first structural member and a second structural member. Each of the first structural member and the second structural member include a body having a first surface, a second surface, and an end surface at an end portion. The end portion includes a root protrusion which extends radially outward from the second surface along a root protrusion radius to an outer end of the root protrusion to define a root protrusion height extending from the second surface to the outer end of the root protrusion. The root protrusion includes a root protrusion width which extends between an inner edge and an outer edge of the outer end of the root protrusion. The root protrusion radius, the root protrusion height, and the root protrusion width of the root protrusion of the first structural member and the root protrusion of the second structural member are configured to locate a weld root within a stress protected weld root region which corresponds to a negligible root stress concentration zone isolated beyond and away from a root stress flow path propagated through the body of the first structural member and the body of the second structural member such that fatigue failure does not occur in the weld root.

In yet another aspect of the present disclosure, a structure is disclosed. The structure includes at least two structural members joined by at least one groove weld. The at least two individual structural members include a first structural member and a second structural member. Each of the first structural member and the second structural member include a body having a first surface, a second surface, and an end surface at an end portion. The end portion includes a toe protrusion which extends radially outward from the first surface along a toe protrusion radius to an outer end of the toe protrusion to define a toe protrusion height extending from the second surface to the outer end of the toe protrusion. The toe protrusion includes a toe protrusion width which extends between an inner edge and an outer edge of the outer end of the toe protrusion. The toe protrusion radius, the toe protrusion height, and the toe protrusion width of the toe protrusion of the first structural member and the toe protrusion of the second structural member are configured to locate a weld toe within a stress protected weld toe region which corresponds to a negligible toe stress concentration zone isolated beyond and away from a toe stress flow path propagated through the body of the first structural member and the body of the second structural member such that fatigue failure does not occur in the weld toe.

Figure 1:
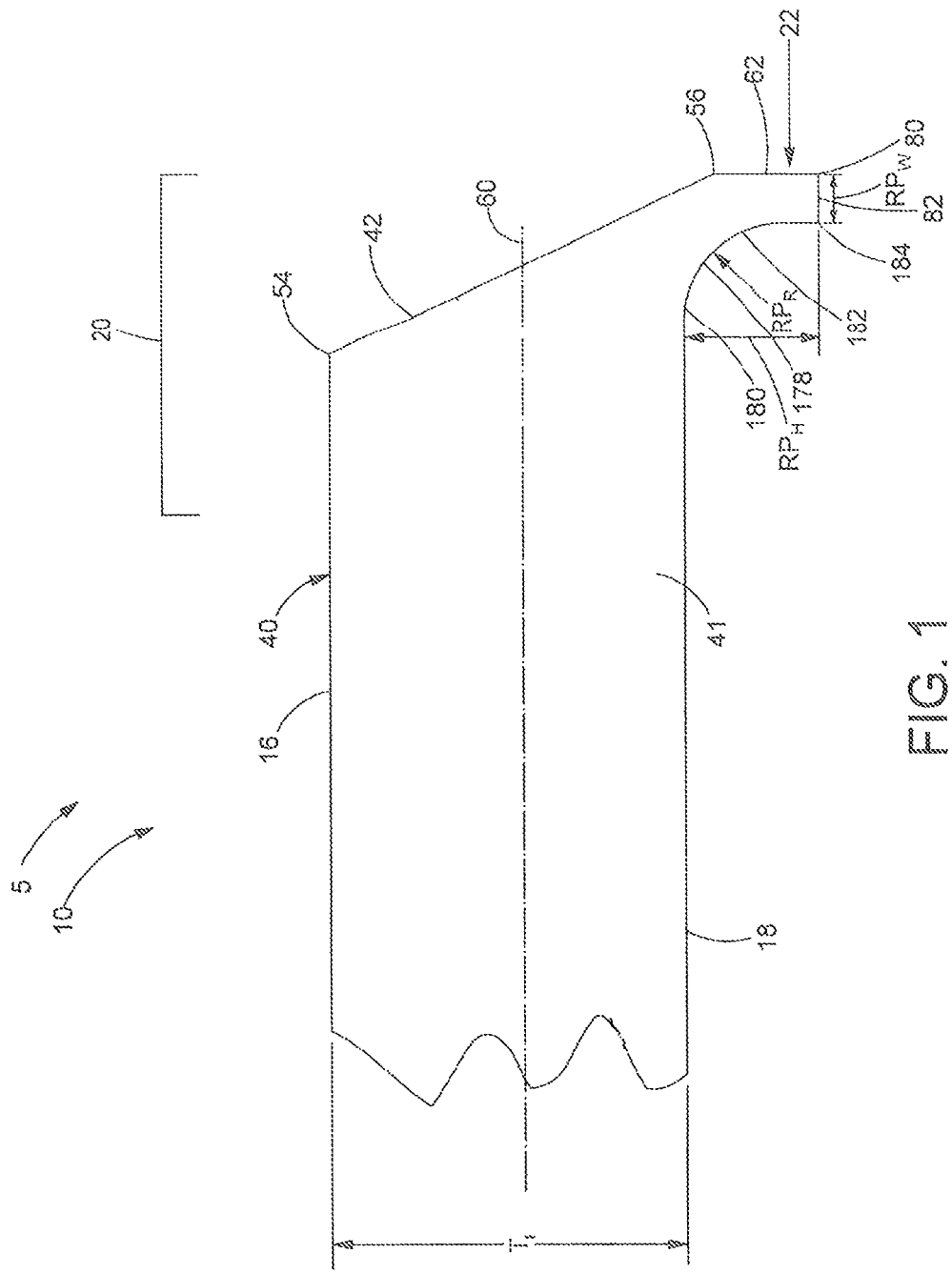
FIG. 1 is a side view illustration of a structural member according to an exemplary embodiment of the present disclosure.

While the following detailed description is given with respect to certain illustrative embodiments, it is to be understood that such embodiments are not to be construed as limiting, but rather the present disclosure is entitled to a scope of protection consistent with all embodiments, modifications, alternative constructions, and equivalents thereto.

DETAILED DESCRIPTION

The present disclosure is directed to any structure 1 composed of at least two structural members 5 joined by at least one groove weld according to any one or more of the embodiments disclosed herein. While in certain embodiments the structure 1 may be described and illustrated as including a first structural member 10 and a second structural member 12 for the purposes of providing exemplary descriptions of the features of the structural members 10, 12 and the groove welds of each of the disclosed embodiments, it will be appreciated that the structure 1 can include numerous structural members 5 (e.g., a third, fourth, fifth structural member, etc.) which are joined by multiple groove welds and include any one or more of the protected geometries and features according to any one or more of the embodiments as disclosed herein. Reference will now be made in detail to specific embodiments or features, examples of which are illustrated in the accompanying drawings. Generally, corresponding or similar reference numbers will be used, when possible, throughout the drawings to refer to the same or corresponding parts. Elements in schematics, included in the drawings, and described herein, may not be drawn with dimensions or to scale, but may rather be drawn to illustrate different aspects of the disclosure.

Figure 20:
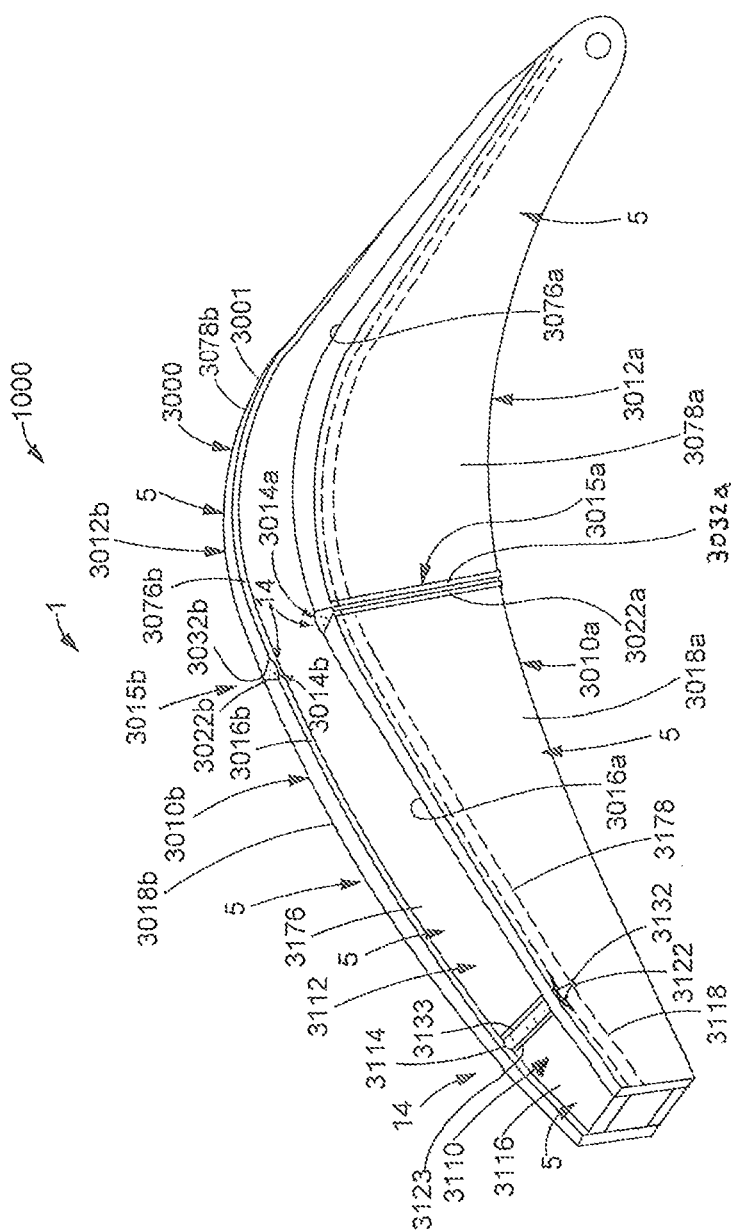
FIG. 20 is a perspective view of an exemplary overall structure having at least one groove weld illustrated as a boom structure incorporating the structure including two or more structural members joined by at least one groove weld according to the present disclosure.

Referring now to the drawings a structural member 5 or a first structural member 10 is depicted. The first structural member 10 can be any structural member 5 which is configured to be joined to another structural member 5 or a second structural member 12 by a groove weld 14 to form a weldment and resultant structure 1, or any part thereof, as further disclosed herein. As such, each of the structural members 5 disclosed herein, including, in part, the first and second structural members 10 and 12 (and the respective bodies 40, 240 thereof, as further discussed herein) are composed of metal, including but not limited to iron, steel, aluminum, or any metal or any alloys thereof capable of being joined via a groove weld 14 as disclosed herein. For the purposes of the present disclosure, the term "welding" (or "weld"), includes any process or the result thereof wherein two structural members 10, 12 or other metal components are joined together by the affixation of adjacent and/or mating edges or surfaces as a result of a mutual thermal, frictional, or any other type of bonding transformation therebetween. The groove weld 14 may include, but is not limited to, shielded metal arc welding, gas tungsten arc welding or tungsten inert gas welding, gas metal arc welding or metal inert gas welding, flux-cored arc welding, submerged arc welding, electroslag welding, and the like, and can also include cladding, brazing, soldering, friction stir welding, laser welding, and hybrid laser arc welding. The structural members 5, 10, 12 (and main bodies 41, 241 thereof, as further disclosed herein) can be formed to embody or include any of a variety of shapes, contours, profiles, bodies, objects, structures, or any combination or combinations thereof as necessary to form any suitable or desired structure, including but not limited to one or more of the structures 1 and/or overall structures 1000 as disclosed herein. In particular, the structural members 5, 10, 12 (and main bodies 41, 241 thereof, as further disclosed herein) may be planar to define a plate. Alternatively, the structural members 5, 10, 12 (and main bodies 41, 241 thereof, as further disclosed herein) may include a contoured shape or profile, all or a portion of the contoured shape or profile of the structural members 5, 10, 12 (and main bodies 41, 241 thereof) may be and/or may include any one or more of planar, arcuate, cylindrical, concave, convex, and incurvate shape (and any of various combinations thereof) to form a contoured structural member, panel, and/or plate (such as, for example, the structural panel or plate members 3110 and 3112 as shown in FIG. 20). In yet another non-limiting example, the structural members 5, 10, 12 (and main bodies 41, 241 thereof) may be tubular, and may be cylindrical or curved to form a cylindrical tube, or may form a non-cylindrical tube.

Figure 2:
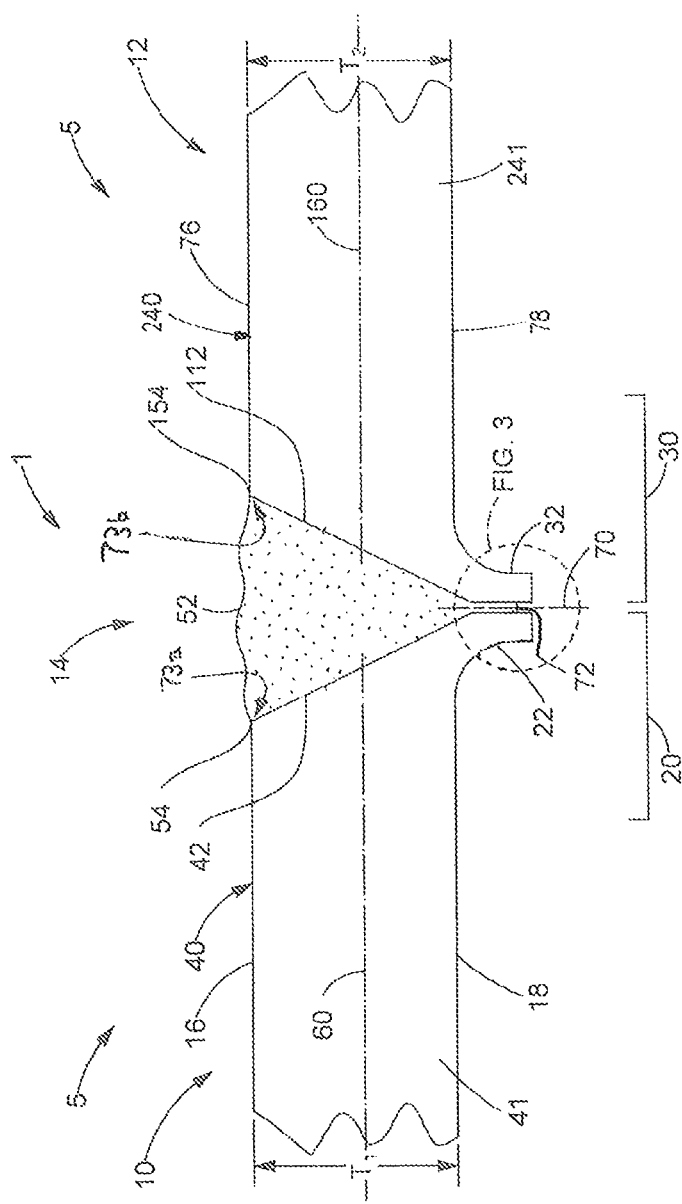
FIG. 2 is a side view of a structure formed by structural members joined by a groove weld according to an exemplary embodiment of the present disclosure.
Figure 3:
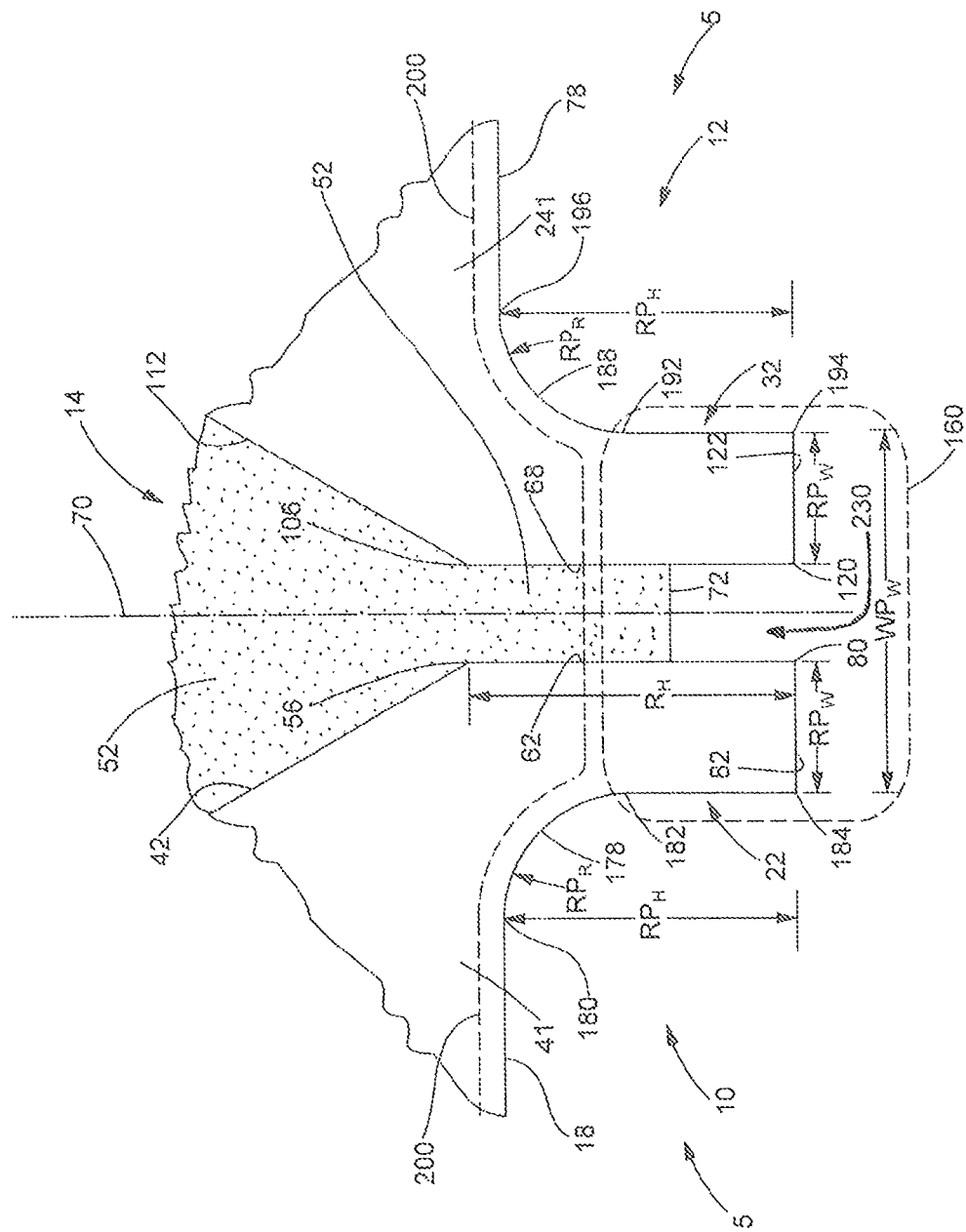
FIG. 3 is an enlarged side view of the structure formed by structural members joined by a groove weld according to the exemplary embodiment of the present disclosure illustrated in FIG. 1.

FIGS. 1-3 illustrate an embodiment of a structure 1 formed by two or more structural members 5, illustrated as first structural member 10 and second structural member 12, joined by a groove weld 14. In the exemplary embodiment shown in FIGS. 2-3, the first and second structural members 10, 12 include correspondingly equivalent, opposing, aligned orientations, geometries and features. However, without departing from the spirit and scope of the present invention, the structural members 5, depicted as first structural member 10 and/or the second structural member 12 may have dissimilar and/or additional orientations, geometries and/or features, including those as described in the embodiments illustrated in FIGS. 4-11. Referring to FIGS. 1-3, the first structural member 10 includes a first surface 16, a second surface 18, and at least one end portion 20 which includes a root protrusion 22, and similarly, the second structural member 12 includes a first surface 76, a second surface 78, and at least one end portion 30 which includes a root protrusion 32. The end portions 20, 30 and root protrusions 22, 32 are included at each of any one or more outer edges, sides, extensions, or boundaries of the first structural member 10 and second structural member 12 which are configured to be joined, via a groove weld 14, to an adjacent, corresponding, opposing, end portion 30, 20 and root protrusion 32, 22 of an opposing second or first structural member 12, 10 (or any other structural member 5 including, in part, any root protrusion according to the present disclosure) to form a structure 1. The first surfaces 16, 76 may define outer or upper surfaces of the first structural member 10 and second structural member 12 and the resulting structure 1. The second surfaces 18, 78 may define inner or lower surfaces of the first structural member 10 and second structural member 12 and the resulting structure 1. In the alternative, the first surfaces 16, 76 may define inner or lower surfaces of the first structural member 10 and second structural member 12 and the resulting structure 1, and the second surfaces 18, 78 may define outer or upper surfaces of the first structural member 10 and second structural member 12 and the resulting structure 1 depending upon the type, use, application, constraints, or other considerations attendant to the structure 1, including but not limited to the formation thereof. As such, although the relative terms "above", "outer", "upper", "raised", "below", "lower", "lowered", or "inner" may be used, such terms are used exclusively for the purposes of identifying and disclosing the various features of the disclosure herein with respect to and relative to the orientation of the illustrated Figures, but should not be construed as limiting the scope of the disclosure as excluding orientations which may differ from the illustrated Figures, but in all other respects are equivalent.

The first structural member 10 and second structural member 12 include a body 40, 240, respectively, wherein the bodies 40, 240 can form and define the composition and features of the first and second structural members 10, 12. The bodies 40, 240 of the first and second structural members 10, 12 can be composed of and formed by any metal or any alloys thereof capable of being joined via a groove weld 14 (as disclosed above) which, for the purposes of the present disclosure, can be defined as "parent material" which may be stronger, more durable, or otherwise more resistant to stress, fatigue, and/or failure than the resultant groove weld 14, and the material or materials forming the same, including, in part, the filler material 52. The respective bodies 40, 240 of the first and second structural members 10, 12 can be defined as overall bodies thereof which can include the root protrusions 22, 32 (as well as toe protrusions 23, 33) such that the root protrusions 22, 32 (as well as toe protrusions 23, 33) can be constituents of and included as being unitary with the respective overall bodies 40, 240 of the first and second structural members 10, 12, and can be formed by the same parent material or otherwise formed as included as an integral part of the same unitary body thereof, as further discussed herein. The body 40 of the first structural member 10 and the body 240 of the second structural member 12 can also include a main body 41 and a main body 241, respectively, which can be defined as the main portion of the overall body 40 of the first structural member 10 and the overall body 240 of the second structural member 12 formed entirely of parent material and including all of the features thereof but does not include the root protrusions 22, 32 (as well as toe protrusions 23, 33). The main body 41 of the first structural member 10, and in one embodiment, the end portion 20 thereof, includes a thickness $T_1$ which extends from the first surface 16 to the second surface 18. The main body 241 of the second structural member 12, and in one embodiment, the end portion 30 thereof, includes a thickness $T_2$ which extends from the first surface 76 to the second surface 78. The end portion 20 of the first structural member 10 is defined by, and includes, in part, terminal or end portions or segments of the first surface 16 and the second surface 18 which define an outer edge, side, extension, or boundary of the first structural member 10 (and the main body 41 thereof) configured to be placed adjacent to an end portion 30 of the second structural member 12 (similarly defined by and including terminal or end portions or segments of the first surface 76 and the second surface 78 which define an outer edge, side, extension, or boundary of the second structural member 12 (and main body 241 thereof)) and joined thereto via a groove weld 14 as illustrated in FIGS. 2 and 3. In particular, the end portion 20 includes an end or a terminal portion of the first and second surfaces 16, 18 as well as at least one end surface 42 which defines an end, outer edge, extension, or boundary of the first structural member 10 to be joined to a second structural member 12 via the groove weld 14 as shown in FIGS. 2 and 3. Similarly, the end portion 30 of the second structural member 12 includes an end or a terminal portion of the first and second surfaces 76, 78 as well as at least one end surface 112 which defines an end, outer edge, extension, or boundary of the second structural member 12 to be joined to the first structural member 10 via the groove weld 14 as shown in FIGS. 2 and 3. As such, the end surfaces 42 and 112 are included in the surfaces which are thermally bonded and transformed via the heat and energy of the groove weld 14, including but not limited to the filler material 52 thereof, such that the first structural member 10 is joined or affixed to the second structural member 12 via the groove weld 14. The end surface 42 extends from a first end 54, which defines a terminal end of the first surface 16 of the first structural member 10 (and the main body 41 thereof) oriented proximate to the groove weld 14 (as shown in FIG. 2) and positioned within the end portion 20 of the first structural member 10, toward the second surface 18 to a second end 56 which is positioned below or beyond the second surface 18. Similarly, the end surface 112 of the second structural member 12 extends from a first end 154, which defines a terminal end of the first surface 76 of the second structural member 12 (and the main body 241 thereof) oriented proximate to the groove weld 14 (as shown in FIG. 2) and positioned within the end portion 30 of the second structural member 12, toward the second surface 78 to a second end 106 which is positioned below or beyond the second surface 78 of the second structural member 12. Although the end surface 42 of the first structural member 10 and the end surface 112 of the second structural member 12, are each illustrated in FIGS. 1-3 (as well as certain additional Figures) as single surfaces extending linearly at a constant angle, the end surface 42 of the first structural member 10 and the end surface 112 of the second structural member 12 can additionally be curved, arcuate, and/or partially concave and/or convex, or can include and be formed by multiple segments of varying curved, arcuate, and/or partially concave, convex, and/or linear geometries and/or angles (or can include any other geometry and/or additional surfaces sufficient to be joined by the groove weld 14 and receive the filler material 52 thereof) extending from the respective first ends 54, 154 to the respective second ends 56, 106 of the first and second structural members 10, 12 without departing from the scope of the present disclosure. Additionally, the angles of the surfaces 42, 112 as shown in the embodiment of FIGS. 1-3 (as well as, in part, of those of FIGS. 4-12) should not be construed as limiting the scope of the disclosure, as the angles of one or more of the surfaces 42, 112 can be closer to perpendicular, such as, to provide a non-limiting example, as narrow as within five degrees (or less) with respect to the a center vertical axis 70 of the weld root 72, or alternatively the angles of one or more of the surfaces 42, 112 can be can be wider than those shown in any of the illustrated embodiments, or any other angle, shape, and/or orientation which is capable of the application of any process applied thereto to join the first structural member 10 to the second structural member 12 via any weld as defined herein, without departing from the spirit and scope of the present disclosure.

The end portion 20 of the first structural member 10 also includes a root protrusion 22 which extends beyond and protrudes outward from the second surface 18 at the end portion 20 of the first structural member 10. The root protrusion 22 may include a portion of the end surface 42 proximate to, and including, the second end 56 of the end surface 42 that extends beyond the second surface 18 and additionally includes an outer, root extension surface 62 extending outward from and is positioned below or as extending entirely beyond the outer linear boundary of the terminal end of the second surface 18 (and the main body 41 of the first structural member 10) proximate to the groove weld 14 and within the end portion 20 of the first structural member 10 such that the root protrusion 22 defines and is positioned within a stress protected weld root region 160 as further discussed herein. Similarly, as shown in FIGS. 2-3, the end portion 30 of the second structural member 12 also includes a root protrusion 32 which extends beyond and protrudes outward from the second surface 78 at the end portion 30 of the second structural member 12. The root protrusion 32 of the second structural member 12 may include a portion of the end surface 112 proximate to, and including, the second end 106 of the end surface 112 that extends beyond the second surface 78 and additionally includes an outer, root extension surface 68 extending outward from and is positioned below or as extending entirely beyond the outer linear boundary of the terminal end of the second surface 78 (and the main body 241 of the second structural member 12) proximate to the groove weld 14 and within the end portion 30 of the second structural member 12 such that the root protrusion 32 defines and is positioned within a stress protected weld root region 160 as further discussed herein.

The root extension surface 62 of the first structural member 10 is oriented as facing outward and away from the main body 41 of the first structural member 10, and the root extension surface 68 is oriented as facing outward and away from the main body 241 of the second structural member 12. The root extension surface 62 of the first structural member 10 can extend outwardly from the second end 56 of the end surface 42 further outwardly, beyond, and away from the outer or lower boundary of the main body 41 of the first structural member 10 defined by the second surface 18 to terminate at an outer edge 80 of an outer end 82 of the root protrusion 22. Similarly, the root extension surface 68 of the second structural member 12 can extend outwardly from the second end 106 of the end surface 112 further outwardly, beyond, and away from the outer or lower boundary of the main body 241 of the second structural member 12 defined by the second surface 78 to terminate at an outer edge 120 of an outer end 122 of the root protrusion 32 of the second structural member 12. The geometries and dimensions of the root protrusions 22, 32 of the first and second structural members 10, 12 are configured such that at least a portion of the length of the root extension surface 62 of the first structural member 10 is oriented to face at least a portion of the length of the second root extension surface 68 of the second structural member 12, which, in the exemplary embodiment shown in FIGS. 2-3 (as well of those of FIGS. 4-12), with weld gap 230 therebetween, when the end portions 20, 30 of the first and second structural members 10, 12 are placed adjacent to one another to form the groove weld 14 such that the weld root 72 is positioned between (or extends as protruding outward from) the adjacently facing segments of the root extension surface 62 of the first structural member 10 and the root extension surface 68 of the second structural member 12 positioned at a location below or beyond, and outwardly away from the second surface 18 of the first structural member 10 and the second surface 78 of the second structural member 12 (or, as further discussed herein, the lower or outermost (or most proximate to the weld root) second surface 18 or 78) (and the main bodies 41, 241 thereof) such that the weld root 72 is positioned within a stress protected weld root region 160 and isolated beyond and away from the root stress flow path 200 as shown in FIGS. 4-10 and as further discussed herein with reference to FIGS. 13-15. In the exemplary embodiment shown in FIGS. 1-3, the root extension surface 62 of the first structural member 10 (as well as the root extension surface 68 of the second structural member 12) can be generally parallel to a center vertical axis 70 of the weld root 72. As further shown in the exemplary embodiment shown in FIGS. 1-3, the root extension surfaces 62, 68 of the first structural member 10 (as well as that of the second structural member 12 as shown in FIGS. 2 and 3) can be coplanar with the corresponding second root extension surface 68 of the second structural member 12 as shown in FIGS. 2 and 3. The root extension surfaces 62, 68 shown in the embodiment of FIGS. 1-3 are also shown as perpendicular to the central medial axis 60 of the cross sectional profile of the end portion 20 of the body 40 of the first structural member 10. The root extension surfaces 62, 68 additionally may be perpendicular to one or more of the first and second surfaces 16, 18 of the first structural member 10 and the first and second surfaces 76, 78 of the second structural member 12. However, in other embodiments, including those as discussed herein, one or more of the root extension surfaces 62, 68 can be slightly angled or slightly curved, and can extend at an angle or along a curve, respectively, inwardly toward the central vertical axis 70 and the opposing root extension surface 62, 68 as the root extension surfaces 62, 68 extend from the second ends 56, 106 of the end surfaces 42, 112 to the outer edges 80, 120 of outer end surfaces 82, 122 of the root protrusions 22, 32. It should be appreciated that differences may exist between the embodiment shown in FIGS. 1-3, including, in part, one or more individual surfaces having any of a variety of differing shapes, contours, orientations, and the like, including but not limited to those referred to above, yet still fall within the scope of the present disclosure as defining and/or forming a protrusion 22, 32 as having geometry and relative dimensions including a radius $RP_R$, a root protrusion height $RP_H$, and a width $RPw$ configured to define, form, locate, and isolate the weld root 72 within a stress protected weld root region 160 outward, beyond, below, and away from the root stress flow path 200, as further discussed herein.

The outer end 82 of the root protrusion 22 can define an outward-most boundary of the root protrusion 22 of the first structural member 10 with respect to and extending away from the second surface 18 thereof, and the outer end 122 of the root protrusion 32 can define an outward-most boundary of the root protrusion 32 of the second structural member 12 with respect to and extending away from the second surface 78 thereof. The outer ends 82, 122 may also define an outwardly extending rib or a seam extending along and throughout the weld root 72 and the end of the structural member 10, 12 as further shown in FIGS. 2 and 3 as well as FIGS. 4-10, 19 & 20 (and as further discussed herein with reference to FIGS. 13-15) within the stress protected weld root region 160.

As further discussed herein, one or more of the size, shape, and/or dimensions of the root protrusions 22, 32 can be defined, at least in part, by the dimension of an arcuate inner surface 178, 188 (and in one embodiment, the radius $RP_R$ thereof) of the root protrusions 22, 32 oriented on a side of the root protrusions 22, 32 opposite the root extension surface 62, 68, of the respective first and second structural members 10, 12. The arcuate inner surface 178 is positioned within the end portion 20 of the first structural member 10 and can be defined as a transition surface by which the root protrusion 22 extends outwardly from the second surface 18 and away from the root stress flow path 200. In particular, the arcuate inner surface 178 of the root protrusion 22 of the first structural member 10 extends radially outwardly from an initial radial end 180, which defines a terminal end of the second surface 18 (as well as a terminal end and outer boundary of the main body 41 of the first structural member 10) which is oriented proximate to the groove weld 14 (as shown in FIGS. 2 and 3), along a radius $P_R$, to a terminal radial end 182 of the arcuate inner surface 178 which can be at, or proximate to, and in one embodiment, vertically aligned with, an inner edge 184 of the outer end 82 of the root protrusion 22.

The radius $RP_R$ along which the arcuate inner surface 178 extends can define the dimension of the arcuate inner surface 178, and further can define, in part, the cross sectional width $RP_w$ of the root protrusion 22 and the outer end 82 thereof. The arcuate inner surface 188 of the second structural member 12 is positioned within the end portion 30 of the second structural member 12 and can be defined as a transition surface by which the root protrusion 32 extends outwardly from the second surface 78 and away from the root stress flow path 200. In particular, the arcuate inner surface 188 of the root protrusion 32 of the second structural member 12 extends radially outwardly from an initial radial end 196, which defines a terminal end of the second surface 78 (as well as a terminal end and outer boundary of the main body 41 of the first structural member 10) which is oriented proximate to the groove weld 14 (as shown in FIGS. 2 and 3), along a radius $RP_R$, to a terminal radial end 192 of the arcuate inner surface 188 which can be at, or proximate to, and in one embodiment, vertically aligned with, an inner edge 194 of the outer end 122 of the of the root protrusion 32 of the second structural member 12. The cross sectional width $RP_w$ can be defined as the horizontal linear distance between one or more of the root extension surfaces 62, 68 and/or the outer edges 80, 120 of the outer ends 82, 122, respectively; and the terminal radial ends 182, 192 of the arcuate inner surfaces 178, 188 and/or the inner edges 184, 194 of the outer ends 82, 122 of the respective protrusions 22, 32, of the first and second structural members 10, 12. In one embodiment, the radius $RP_R$ of the arcuate inner surface 178 of the root protrusion 22 of the first structural member 10 and the radius $RP_R$ of the arcuate inner surface 188 of the root protrusion 32 of the second structural member 12 can be substantially constant, or alternatively can be variable. The dimension of the arcuate inner surface 178 (and in one embodiment, the radius $RP_R$ thereof) of the root protrusion 22 of the first structural member 10, can further define, in part, the root protrusion height $RP_H$ which is the linear distance at which the root protrusion 22 extends outward from and beyond the outer boundary of the first structural member 10 (and the main body 41 thereof) defined by the second surface 18. This is defined as the distance extending linearly and vertically outward from the initial radial end 180 of the arcuate inner surface 178 (and/or the terminal end of the second surface 18) to the outer end 82 of the root protrusion 22. The dimension of the arcuate inner surface 188 (and in one embodiment, the radius $RP_R$ thereof) of the root protrusion 32 of the second structural member 12, can further define, in part, the root protrusion height $RP_H$ of the second structural member 12 which is the linear distance at which the root protrusion 32 extends outward from and beyond the outer boundary of the second structural member 12 (and the main body 241 thereof) defined by the second surface 78. This is defined as the distance extending linearly and vertically outward from the initial radial end 196 of the arcuate inner surface 188 (and/or the terminal end of the second surface 78) to the outer end 122 of the root protrusion 32 of the second structural member 12.

The axial, tensile and bending loading paths and stress concentrations of the root stress flow path 200 propagated through the first structural member 10 and the second structural member 12 is illustrated in FIGS. 3-10. As further discussed herein, and as will be illustrated in FIGS. 13-18, the geometry and relative dimensions of the radius $RP_R$ of the arcuate inner surfaces 178, 188, the root protrusion height $RP_H$, and the width of the RPw of the root protrusion 22 of the first structural member 10 and the root protrusion 32 of the second structural member 12, respectively, as well as the resulting total weld root protrusion width WRPw are selected and configured to define, form, locate, and isolate the weld root 72 within a stress protected weld root region 160 outward, beyond, below, and away from the root stress flow path 200 and to deflect, alter, and redirect and isolate the root stress flow path 200 within the main body 41 of the first structural member 10 and the main body 241 of the second structural member 12, and the parent material thereof, and away from the stress protected weld root region 160 as well as weld root 72 located therein. The root stress flow path 200 is illustrated in FIGS. 3-10. The root stress flow path 200 is applied to, transferred through, and/or propagated through the structure and weldment away from the weld root 72 and to the stronger parent material of the main body 41 and the main body 241 of the first and second structural members 10, 12. Accordingly, the weld root 72 is located, retained and secured outward within the stress protected weld root region 160 by the root extension surfaces 62, 68 and below and beyond and away from the root stress flow path 200. The bond formed between the filler material 52 and first and second structural members 10, 12 and proximate to the weld root 72 is isolated from such load paths and stress concentrations and is positioned in a negligible stress concentration zone such that fatigue failure does not occur in one or more of the weld root 72 and the stress protected weld root region 160.

The end portion 20 and root protrusion 22, as well as the geometries and dimensions thereof as discussed herein, of the first structural member 10 as disclosed herein (as well as the end portion 30 and root protrusion 32 of the second structural member 12) can be formed using any suitable metal fabrication process or processes, which may depend upon the type, use, application, constraints, or other considerations attendant to the resulting structure. In one embodiment, the entirety of the body 40 of the first structural member 10 (as well as the body 240 of the second structural member 12) can be formed via a casting process such that one or more ends, outer edges, extensions, or boundaries of the first structural member 10 include the end portion 20 and root protrusion 22, as well as the geometries and dimensions thereof and are mutually formed and included as the result of a single casting process. Alternatively, the end portion 20 and root protrusion 22 of the first structural member 10 can be formed via one or more rolling, forging, extrusion, bending, machining, and/or additive manufacturing processes, such as metallic 3D printing fabrication processes. It is further contemplated that the end portion 20 and root protrusion 22 of the first structural member 10 may be formed by a combination of two or more fabrication processes, such as casting, rolling, forging, extension, bending, machining, and/or additive manufacturing processes, such as metallic 3D printing fabrication processes. The foregoing disclosure and embodiments, although discussed with respect to the first structural member 10, apply equally with respect to the second structural member 12.

FIGS. 2 and 3 illustrate a structure composed of at least two individual structural body members, namely, the first structural member 10 and the second structural member 12 as shown in FIGS. 2 and 3, which are joined by at least one groove weld 14 to form a weldment and a resulting structure 1. For the purposes of the present disclosure, as illustrated in FIGS. 2 and 3, and as further illustrated in FIGS. 4-10, 19, 20 and 21 and further discussed herein, the structure 1 can be any structure, part, component, article, or any portion of any one or more of the foregoing that includes at least one groove weld 14 which joins two structural members 10, 12. In FIGS. 2 and 3, the first structural member 10 with an end portion 20 is placed adjacent to and facing the end portion 30 of the second structural member 12 to define an open space or groove therebetween which receives the groove weld 14 (and filler material 52 thereof) with root extension surfaces 62, 68 of each substantially aligned and facing one another. The cross sectional width $RP_w$ of the root protrusions 22, 32 and the outer ends 82, 122 of the root protrusions 22, 32 of the first and second structural members 10, 12 and a weld gap 230 formed therebetween define a total weld root protrusion width WRPw of the weld root 72 of the structure. The open space or groove between adjacent, facing end surfaces 42, 112 as well as at least a portion of, or the entirety of, the adjacent, facing root extension surfaces 62, 68 receives the filler material 52 of the groove weld 14 during welding process such that the heated filler material 52 thermally bonds with the end surfaces 42, 112 (as well as at least a portion of, or the entirety of, the adjacent, facing root extension surfaces 62, 68). The first structural member 10 is joined or affixed to the second structural member 12 via the groove weld 14. Furthermore, the root extension surfaces 62, 68 of the first and second structural members 10, 12 are facing one another (and, in the particular embodiment as shown in FIG. 2 and in FIG. 3, are aligned along and generally parallel to the center vertical axis 70 of the weld root 72 to) define the weld gap 230 therebetween configured to receive the heated filler material 52. In addition, in one embodiment, the weld gap 230 is also configured to retain the heated filler material 52 during the welding process.

Still referring to FIGS. 2 and 3, the heated filler material 52 during the welding process is able to penetrate and flow into the weld gap 230. The heated filler material 52 engages and thermally bonds the root extension surfaces 62, 68 of the root protrusions 22, 32 along and throughout at least a portion of, or the entirety of, the root extension height $R_H$ of the root extension surfaces 62, 68 which extend from the second ends 56, 106 of the end surfaces 42, 112 to the outer edges 80, 120 of the outer ends 82, 122 of the root protrusions 22, 32. In one embodiment, the filler material 152 is able to penetrate and flow into the weld gap 230 and engage or thermally bond with the root extension surfaces 62, 68 from the second ends 56, 106 of the end surfaces 42, 112 toward the outer edges 80, 120 of the outer end surfaces 82, 122 of the root protrusions 22, 32 along a linear distance. The linear distance may be less than the root extension height $R_H$ of the root extension surfaces 62, 68 such that the filler material 52 and weld root 72, as shown in FIG. 3, may be entirely retained within the weld gap 230 within the stress protected weld root region 160 as illustrated in FIG. 3 or alternatively the linear distance may be equal to or greater than the root extension height $R_H$ wherein the weld root extends or protrudes beyond or out of the weld gap 230 and past the one or more of the outer edges 80, 120 of the outer ends 82, 122 of the root protrusions 22, 32 and within the stress protected weld root region 160.

The embodiment as illustrated in FIGS. 1-3 and discussed above represents an example of the present disclosure which is shown as having first and second structural members 10, 12 having equal, or nearly equal thicknesses (wherein thickness $T_1$ of the first structural member 10=thickness $T_2$ of the second structural member 12); aligned, or nearly aligned first surfaces 16, 76 and second surfaces 18, 78, as well as root protrusions 22, 32 which have equivalent root protrusion heights and widths $RP_H$, RPw, and aligned, parallel, coplanar root extension surfaces 62, 68 having equivalent root extension heights $R_H$. However, the foregoing disclosure should not operate to limit the scope of the present disclosure, as the present disclosure is meant to equally include first and second structural members 10, 12 having one or more of differing thicknesses $T_1$, $T_2$, one or more angled or non-aligned first surfaces 16, 76 and second surfaces 18, 78, differing root protrusion heights and widths $RP_H$, RPw, and offset, angled, dissimilar, and/or curved or arcuate root extension surfaces 62, 68 including but not limited to as illustrated and discussed in the exemplary embodiments of FIGS. 4-10.

With the exception of the differing and/or additional orientations, geometries and/or features as shown in the embodiments of FIGS. 4-10 as discussed and identified herein, each of the embodiments of FIGS. 4-10 otherwise include and incorporate the elements, features and attributes of the disclosure of the embodiment of FIGS. 1-3 above therein. As provided above, FIGS. 4-10 each disclose additional embodiments of a structure 1 formed by two or more structural members 5 illustrated as first structural member 10 and second structural member 12, and the root protrusions 22, 32 thereof, joined by a groove weld 14 to form the resultant structure 1 as discussed with respect to FIGS. 1-3 above. Consistent with the embodiment of FIGS. 1-3, the first and second structural members 10, 20 of each of the embodiments of FIGS. 4-10 include root protrusions 22, 32 formed as having geometry and relative dimensions which are configured to limit the depth by which the stress path extends beyond and outward from second surfaces 18, 78 within the weld root region 160 and proximate to the weld root 72 and retain or locate and secure the weld root 72 outward from the main bodies 41, 241 and within the stress protected weld root region 160 via the root extension surfaces 62, 68 and below and beyond and away from the root stress flow path 200. In particular, and consistent with the embodiment of FIGS. 1-3, the first and second structural members 10, 20 of the embodiments of FIGS. 4-10 each include root protrusions 22, 32 having geometry and relative dimensions of the radius $RP_R$ of the arcuate inner surfaces 178, 188, the root protrusion height $RP_H$, and the width of the RPw of the root protrusion 22 of the first structural member 10 and the root protrusion 32 of the second structural member 12 to define, form, locate, and isolate the weld root 72 within the stress protected weld root region 160 outward and away from, beyond or below the outer boundary of the main body 41 defined by the terminal end of the second surface 16 of the first structural member 10 and the outer boundary of the main body 241 defined by the terminal end of the second surface 76 of second structural member 12 and thus outward, beyond, below, and away from the root stress flow path 200 to locate the stress concentrations thereof within the parent material of the main bodies 41, 241 of the first and second structural members 10, 12.

Figure 4:
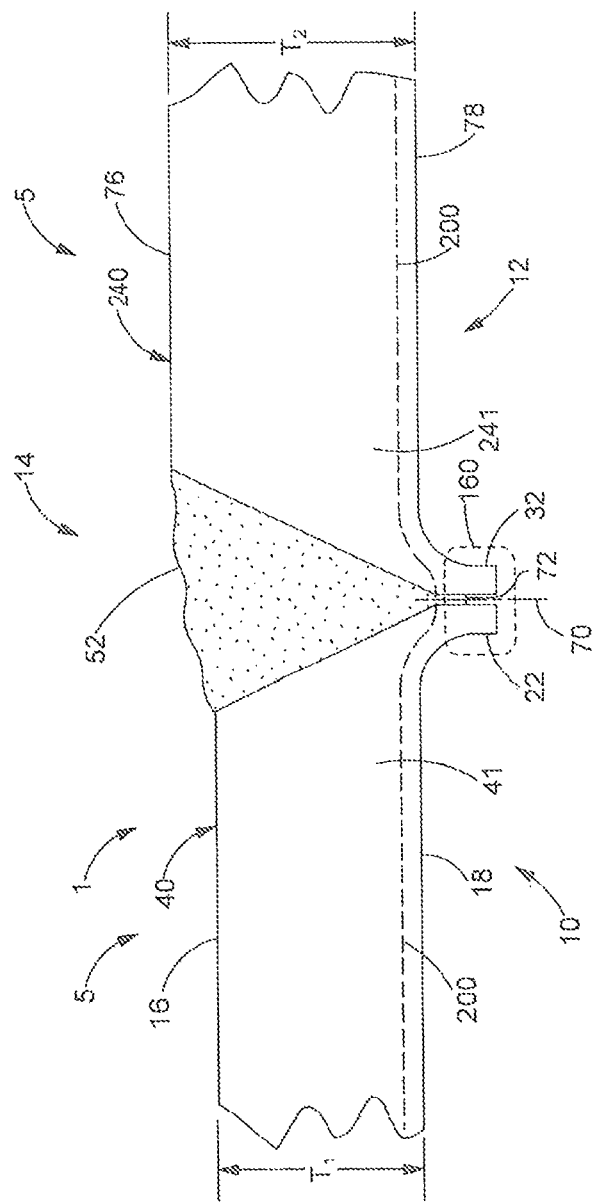
FIG. 4 is a side view of a structure formed by structural members joined by a groove weld according to an exemplary embodiment of the present disclosure.

Referring to the embodiment of FIG. 4, structure 1 includes structural members 5 which include the first and second structural members 10, 12 and the root protrusions 22, 32 thereof joined together via a groove weld 14 in a manner consistent with the embodiment of FIGS. 1-3. However, embodiment of FIG. 4 illustrates an embodiment wherein the second surfaces 18, 78 of the first and second structural members 10, 12 are aligned (or nearly aligned), but the first surface 76 of the second structural member 12 extends above the first surface 16 of the first structural member 10 to provide the second structural member 12 with a main body 241 having a thickness $T_2$ extending from the first surface 76 to the second surface 78 which is greater than the thickness $T_1$ of the main body 41 of the first structural member 10. FIG. 4 illustrates an embodiment wherein first and second structural members 10, 12 can have different thicknesses $T_1$, $T_2$ and non-aligned surfaces, but the root protrusion 22 of the first structural member 10 and the root protrusion 32 of the second structural member 12 remain configured and positioned to define, form, locate, and isolate the weld root 72 within the stress protected weld root region 160 outward and away from, beyond or below the outer boundary of the main body 41 defined by the terminal end of the second surface 16 of the first structural member 10 and the outer boundary of the main body 241 defined by the terminal end of the second surface 76 of second structural member 12 and thus outward, beyond, below, and away from the root stress flow path 200 consistent with the embodiment of FIGS. 1-3.

Figure 5:
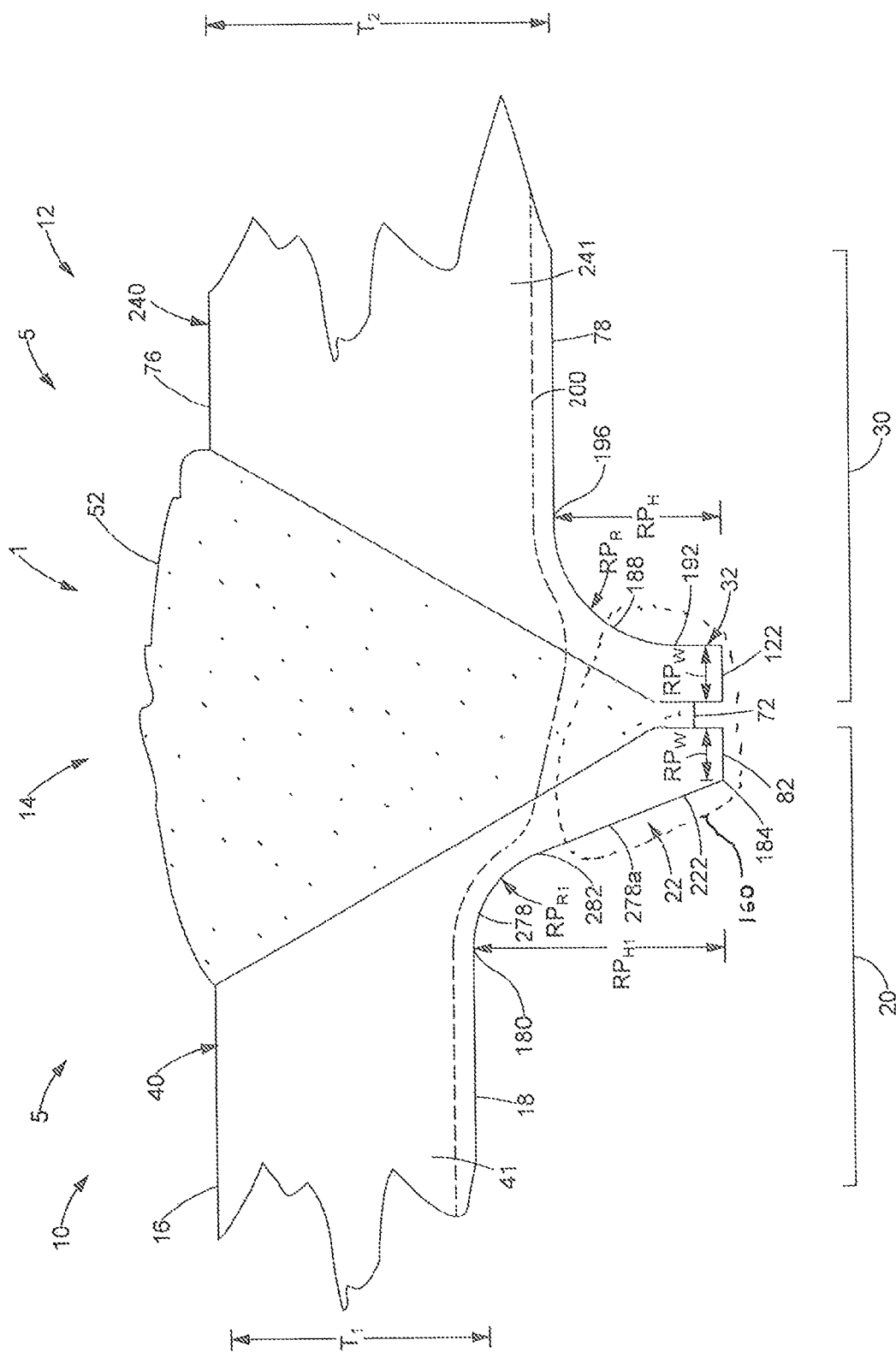
FIG. 5 is a side view of a structure formed by structural members joined by a groove weld according to an exemplary embodiment of the present disclosure.

FIG. 5 illustrates an embodiment of the structure 1 including one structural member which is consistent with the disclosure of FIGS. 1-3 above (illustrated as the second structural member 12) and another structural member (illustrated as the first structural member 10) having a first surface 16 aligned (or nearly aligned) with the first surface 76 of the second structural member 12, but having a main body 41 with a thickness $T_1$ extending from the first surface 16 to the second surface 18 of the first structural member 10 which is less than the thickness $T_2$ of the main body 241 second structural member 12. The root protrusion 22 of the first structural member 10 is an elongated radial root protrusion 222 which includes an arcuate inner surface 278 which may be positioned inward from or above one or more of the arcuate inner surface 188 and the terminal radial end 192 of the arcuate inner surface 188 of the protrusion 32 of the second structural member 12. The arcuate inner surface 278 may extend radially outwardly from an initial radial end 180 along a radius $RP_{R1}$ to a terminal radial end which terminates at the inner edge 184 of the outer end 82 of the first structural member 10. As such, in the present embodiment, the radius $RP_{R1}$ may not be constant, and at least a portion of which is greater than the radius $RP_R$ of the arcuate inner surface 188 of the second structural member 12. Alternatively, the arcuate inner surface 278 may include an additional elongated inner surface 278a as a segment thereof, which may extend from a terminal radial end 282 of the arcuate inner surface 278 to the inner edge 184 of the outer end 82 of the first structural member 10. The elongated inner surface 278a may extend linearly from the terminal radial end 282 of the arcuate inner surface 278 to the inner edge 184 of the outer end 82 of the first structural member 10 or radially at a radius that may be greater than the radius $RP_R$ of the arcuate inner surface 188 of the second structural member 12. Alternatively, the arcuate inner surface 278 and/or the elongated inner surface 278a segment thereof elongated inner surface 278a may be formed by a series of multiple linear and/or curved/arcuate segments. Additionally, the arcuate inner surface 278 and/or the elongated inner surface 278a segment thereof of any one or more of the foregoing embodiments may arcuately, angularly, or otherwise taper toward the root extension surface 62 as the elongated inner surface 278a extends from the terminal radial end 282 of the arcuate inner surface 278 to the inner edge 184 of the outer end 82 of the first structural member 10. Furthermore, the elongated radial root protrusion 222 of the first structural member 10 includes an elongated root protrusion height $RP_{H1}$ which extends linearly and vertically outward from the initial radial end 180 of the arcuate inner surface 278 (and/or the terminal end of the second surface 18) to the outer end 82 of the elongated radial root protrusion 222 which is greater than the root protrusion height $RP_H$ of the root protrusion 32 of the second structural member 12.

In the present embodiment, substantially consistent with the embodiment of FIGS. 1-3, the radius $RP_{R1}$, $RP_R$, of each of the respective arcuate inner surfaces 278, 188, the root protrusion height $RP_{H1}$, $RP_H$, of each of the respective protrusions 222, 32, and the width RPw of each of the respective protrusions 222, 32 of the first structural member 10 and the second structural member 12, respectively, are configured to alter and limit the depth by which the stress path 200 extends beyond and outward from second surfaces 18, 78 such that the root extension surfaces 62, 68 isolate the weld root 72 within the stress protected weld root region 160 at a position outward, beyond, below, and away from the root stress flow path 200 at a location below or beyond, and outwardly away from the lower or outermost (or most proximate to the weld root 72) second surface 78 of the second structural member 12 such that the weld root 72 is isolated beyond and away from the root stress flow path 200.

Figure 6:
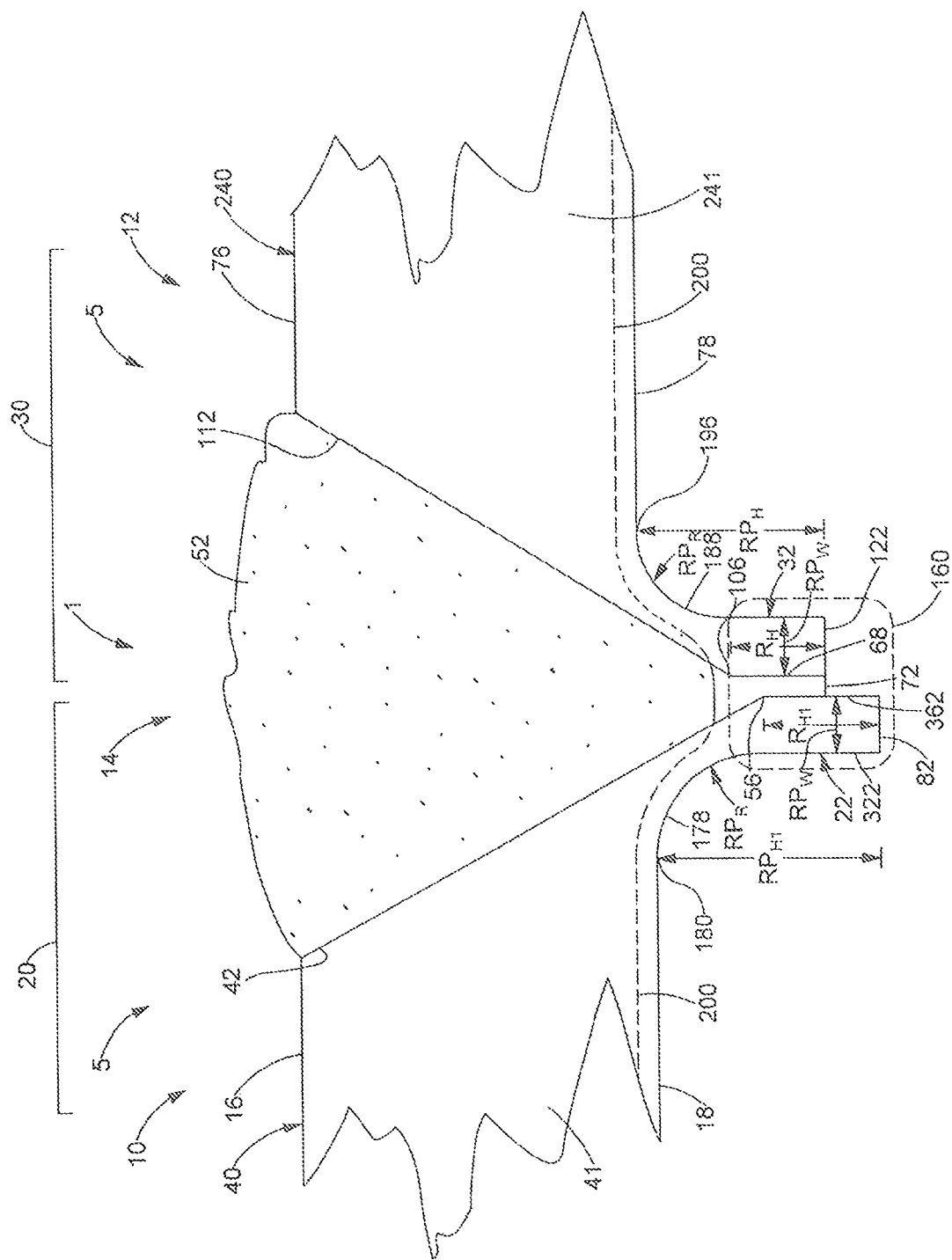
FIG. 6 is a side view of a structure formed by structural members joined by a groove weld according to an exemplary embodiment of the present disclosure.

FIG. 6 discloses yet another embodiment of the present disclosure wherein the root protrusion 22, 32 of one of the structural members 5 (shown, for the purposes of providing an exemplary disclosure, as of the first structural member 10) is embodied as an elongated root protrusion 322 which includes a the root protrusion height $RP_{H1}$ which extends linearly and vertically outward from the initial radial end 180 of the arcuate inner surface 178 (and/or the terminal end of the second surface 18) to the outer end 82 of the elongated root protrusion 322 which is greater than the root protrusion height $RP_H$ of the root protrusion 32 of the second structural member 12. In the embodiment as shown in FIG. 6, the elongated root protrusion 322 also includes a root extension surface 362 which has a root extension height $RH_1$ extending from the second end 56 of the end surface 42 to the outer edge 80, 120 of the outer end 82 of the elongated root protrusion 322 which is greater than the root extension height $R_H$ of the root extension surface 68 of the second structural member 12. Furthermore, the second ends 56, 106 of the end surfaces 42, 112 of the first and second structural members 10, 12 are offset and not aligned. In this embodiment, the geometries and dimensions of the elongated root protrusion 322 of the first structural member 10 as well as the root protrusion 32 of the second structural members 12 are configured such that at least a portion of the root extension height $R_{H1}$ of the root extension surface 362 of the elongated root protrusion 322 is oriented to adjacently face at least a portion of the root extension height $R_H$ of the root extension surface 68 of the second structural member 12 when the end portions 20, 30 of the first and second structural members 10, 12 are placed adjacent to one another to form the groove weld 14. In addition, and substantially consistent with and referencing (and incorporating) the embodiment of FIGS. 1-3 discussed above, in the embodiment of FIG. 6, the radius $RP_R$, of each of the respective arcuate inner surfaces 178, 188, the root protrusion height $RP_{H1}$, $RP_H$, of each of the respective protrusions 322, 32, and the width RPw of each of the respective protrusions 322, 32 of the first structural member 10 and the second structural member 12, respectively, are configured such that the weld root 72 is positioned within the stress protected weld root region 160 formed by the adjacently facing segments of the root extension surface 362 of the elongated root protrusion 322 of the first structural member 10 and the root extension surface 68 of the root protrusion 32 of the second structural member 12 at a location below or beyond, and outwardly away from the second surface 18 of the first structural member 10 and the second surface 78 of the second structural member 12 such that the weld root 72 is isolated beyond and away from the root stress flow path 200.

Figure 7:
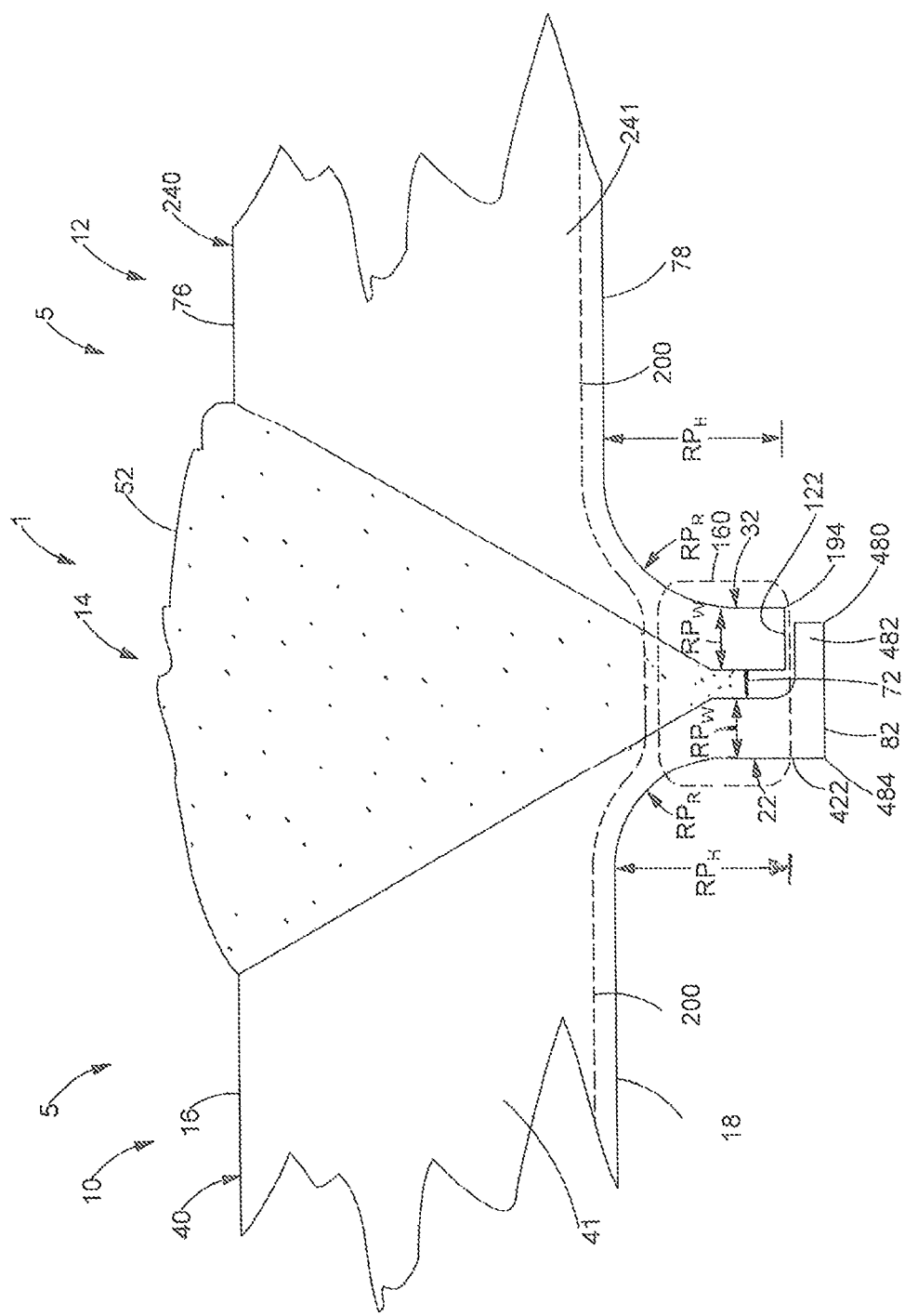
FIG. 7 is a side view of a structure formed by structural members joined by a groove weld according to an exemplary embodiment of the present disclosure.

The embodiment of FIG. 7 illustrates first and second structural members 10, 20 each including root protrusions 22, 32 having geometry and relative dimensions ($RP_R$, $RP_H$, RPw) which define, form, locate, and isolate the weld root 72 within the stress protected weld root region 160 away from the root stress flow path 200 consistent with any one or more of the foregoing embodiments, including that of FIGS. 1-3, to locate the stress concentrations thereof within the parent material of the main bodies 41, 241 of the first and second structural members 10, 12, wherein the root protrusion 22, 32 of one of the structural members 5 (shown, for the purposes of providing an exemplary disclosure, as of the first structural member 10) is embodied as a root extension protrusion 422 including a root protrusion end surface extension 482. In particular, the end surface 82 of the root extension protrusion 422 of the first structural member 10 includes a root protrusion end surface extension 482 or lip formed as an extension of end surface 82 of the root protrusion 22 as shown in FIGS. 1-3 which extends outward from, beyond, or below the end surface 122 of the protrusion 32 of the second structural member 12, and, in one embodiment, may extend along and throughout the total weld root protrusion width WRPw from the inner edge 484 of the root protrusion end surface extension 482, outward from, beyond, or below the end surface 122 of the protrusion 32, and terminates at an outer edge 480 which may be aligned with the inner edge 194 of the end surface 122 of the protrusion 32 of the second structural member 12 which may enable a smooth, continuous interface surface below the weld root 72 between the adjacent first and second structural members 10, 12.

Figure 8:
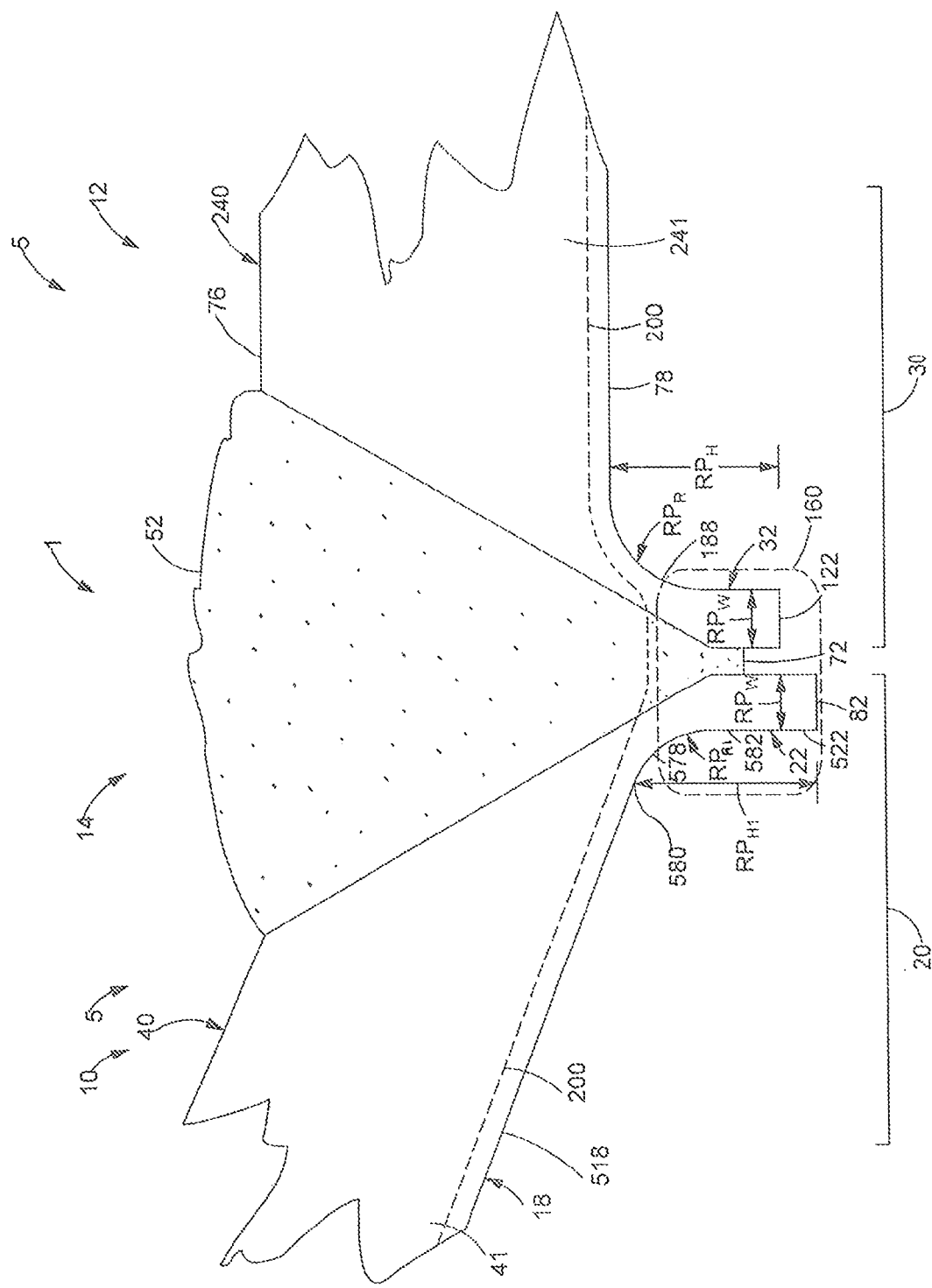
FIG. 8 is a side view of a structure formed by structural members joined by a groove weld according to an exemplary embodiment of the present disclosure.
Figure 9:
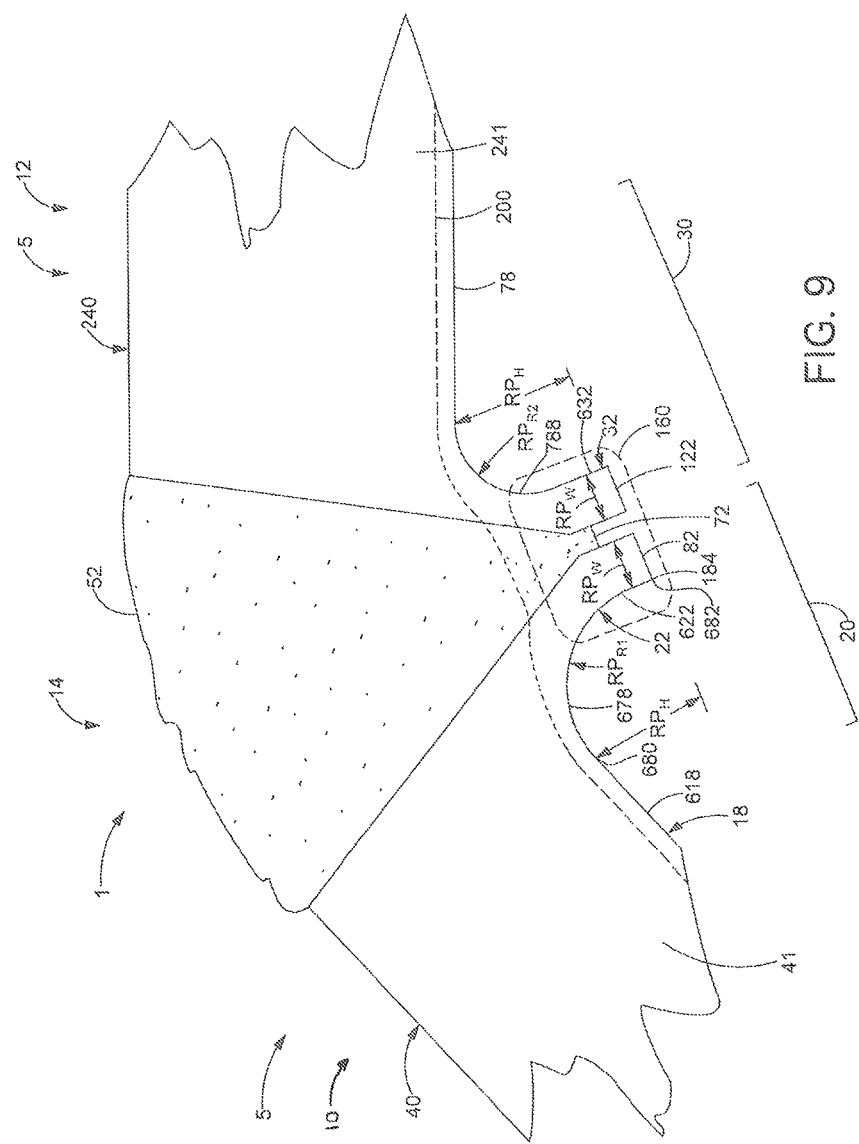
FIG. 9 is a side view of a structure formed by structural members joined by a groove weld according to an exemplary embodiment of the present disclosure.

FIGS. 8 & 9 illustrate embodiments of first and second structural members 10, 12 each including a protrusion 22, 32 joined via a groove weld 14 wherein one or more of the first and second structural members 10, 12 may be angled. In particular, FIG. 8 illustrates an embodiment wherein the first structural member 10 is angled upward or outward with respect to the second structural member 12, and the second surface 78 thereof. The upwardly or outwardly angled first structural member 10 may include an elongated root protrusion 522 which may be consistent with the elongated radial root protrusion 222 as illustrated in FIG. 5 and described above or alternatively may be consistent with the elongated root protrusion 322 as illustrated in FIG. 6 and described above, and further may include an arcuate inner surface 578 which may extend radially outwardly from an initial radial end 580 at the terminal end of the upwardly or outwardly angled second surface 518 of the first structural member 10 along a radius $RP_{R1}$ to a terminal radial end 582 wherein the radius $RP_{R1}$ may not be constant, and at least a portion of which is greater than the radius $RP_R$ of the arcuate inner surface 188 of the second structural member 12. Furthermore, the elongated root protrusion 522 of the first structural member 10 includes an elongated root protrusion height $RP_{H1}$ which extends linearly and vertically outward from the initial radial end 580 of the arcuate inner surface 578 (and/or the terminal end of the upwardly or outwardly angled second surface 518) to the outer end 82 of the elongated root protrusion 522 which is greater than the root protrusion height $RP_H$ of the root protrusion 32 of the second structural member 12.

FIG. 9 illustrates an embodiment wherein the first structural member 10 is angled downward or inward with respect to the second structural member 12, and the second surface 78 thereof. The angled root protrusion 622 of the downwardly or inwardly angled first structural member 10 may include an arcuate inner surface 678 which may extend radially outwardly from an initial radial end 680 at the terminal end of the downwardly or inwardly angled second surface 618 of the first structural member 10 along a radius $RP_{R1}$ to a terminal radial end 682 which terminates at the inner edge 184 of the outer end 82 of the first structural member 10. The radius $RP_{R1}$ of the arcuate inner surface 678 may not be constant, and at least a portion of which may be greater than the radius $RP_{R2}$ of the arcuate inner surface 788 of the protrusion 32 of the second structural member 12 which may be embodied as an angled root protrusion 632, wherein the general orientations of the angled root protrusion 622 of the first structural member 10 and the angled root protrusion 632 of the second structural member 12 may be oriented generally perpendicular to the angle of the first structural member 10. For the purposes of the present disclosure, "generally perpendicular" means that although certain surfaces of the angled root protrusion 622 of the first structural member 10 and the angled root protrusion 632 of the second structural member 12 may be oriented at various angles, may be curved, and/or may include orientations which may not be perpendicular to the angle of the first structural member 10, the various individual surfaces may combine to form the overall orientation of the angled root protrusion 622 and the angled root protrusion 632, as a whole, as perpendicular to the angle of the first structural member 10.

Figure 10:
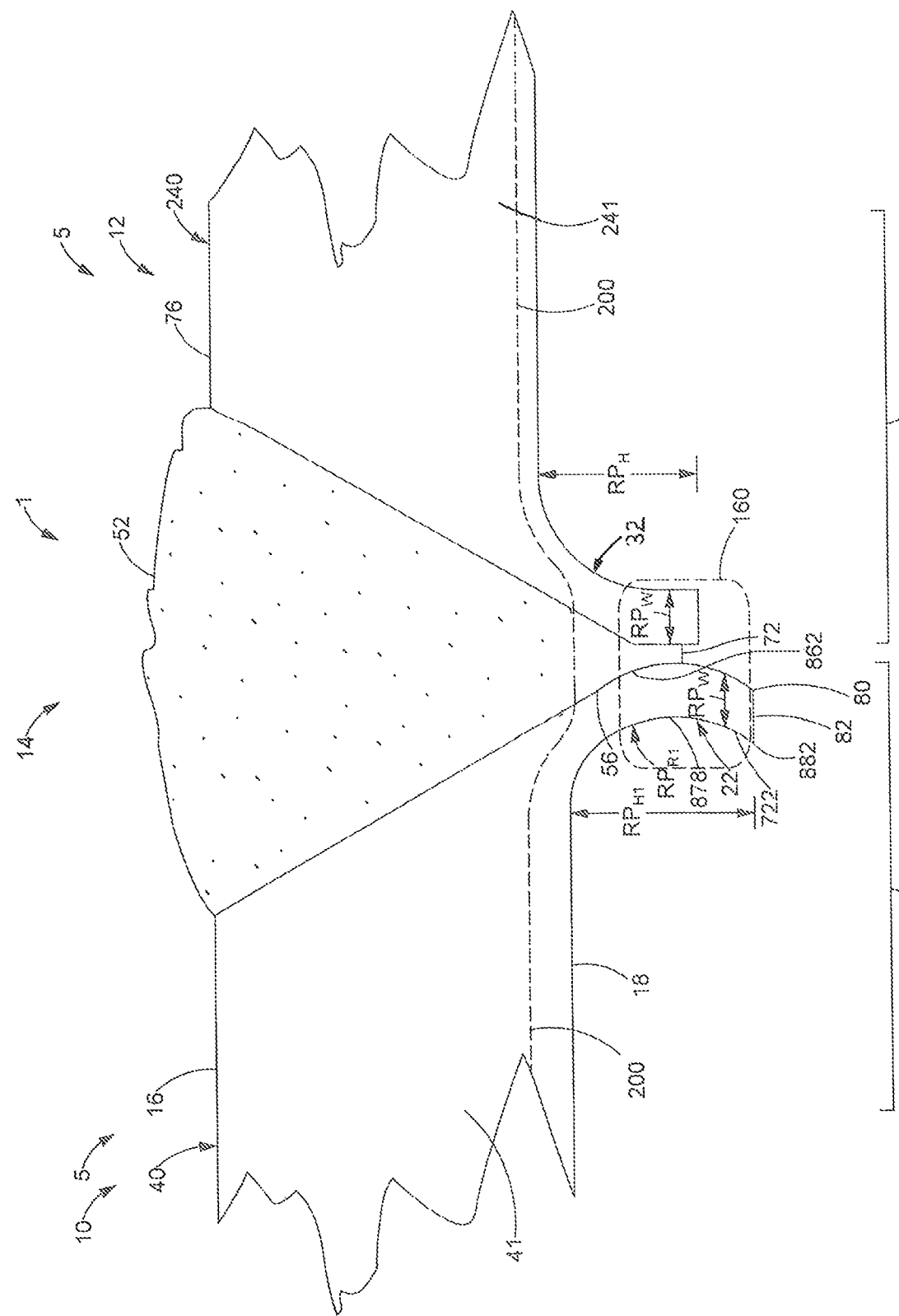
FIG. 10 is a side view of a structure formed by structural members joined by a groove weld according to an exemplary embodiment of the present disclosure.

FIG. 10 illustrates a yet further embodiment of the present disclosure of a protrusion of a structural member (illustrated as protrusion 22 of the first structural member 10) embodied as an arcuate root protrusion 722. The arcuate root protrusion 722 includes an arcuate inner surface 878 that extends radially outwardly from an initial radial end 880, which defines a terminal end of the second surface 18 (as well as a terminal end and outer boundary of the main body 41 of the first structural member 10) which is oriented proximate to the groove weld 14 (as shown in FIGS. 2 and 3), along a radius $RP_{R1}$, to a terminal radial end 882 of the arcuate inner surface 878 which can be at the inner edge 184 of the outer end 82 of the arcuate root protrusion 722. The arcuate inner surface 878 may be formed by one or more, or a series of multiple linear and/or curved/arcuate segments, and the radius $RP_{R1}$ along which arcuate inner surface 878 extends may not be constant. The arcuate root protrusion 722 also includes an arcuate root extension surface 862 extending outwardly from the second end 56 of the end surface 42 further outwardly, beyond, and away from the outer or lower boundary of the main body 41 of the first structural member 10 defined by the second surface 18 to terminate at the outer edge 80 of the outer end 82 of the arcuate root protrusion 722. In the present embodiment, the arcuate root extension surface 862 may be a curved or arcuate surface and may extend along a radius which may be entirely, or alternatively, partially, greater than, but concentric with the radius $RP_{R1}$ of the arcuate inner surface 878 as it extends from the second end 56 of the end surface 42 to the outer edge 80 of the outer end 82. Alternatively, the arcuate root extension surface 862 may be formed by a series of multiple linear and/or curved/arcuate segments. Additionally, the arcuate root extension surface 862 may include an upper half or portion proximate to the second end 56 of the end surface 42 which may be formed by one or more, or a series of multiple linear and/or curved/arcuate segments which may arcuately, curvilinearly, angularly, or otherwise extend outward from second end 56 of the end surface 42 and the main body 41 of the first structural member 10 toward the root extension surface 68 of the second structural member 12 as the arcuate root extension surface 862 extends downwardly from the second end 56 of the end surface 42 and outwardly, beyond, and away from the outer or lower boundary of the main body 41 of the first structural member 10 defined by the second surface 18. The arcuate root protrusion 722 may also include a the root protrusion height $RP_{H1}$ which extends linearly and vertically outward from the initial radial end 880 of the arcuate inner surface 878 (and/or the terminal end of the second surface 18) to the outer end 82 of the arcuate root protrusion 722 which may be greater than the root protrusion height $RP_H$ of the root protrusion 32 of the second structural member 12.

Finally, each of the elongated root protrusion 522 of FIG. 8, the root protrusion 622 and the angled root protrusion 632 of FIG. 9, as well as the arcuate root protrusion 722 of FIG. 10, embody root protrusions 22, 32 having geometry and relative dimensions which define, form, locate, and isolate the weld root 72 within the stress protected weld root region 160 away from the root stress flow path 200 to locate the stress concentrations thereof within the parent material of the main bodies 41, 241 of the first and second structural members 10, 12.

Figure 11:
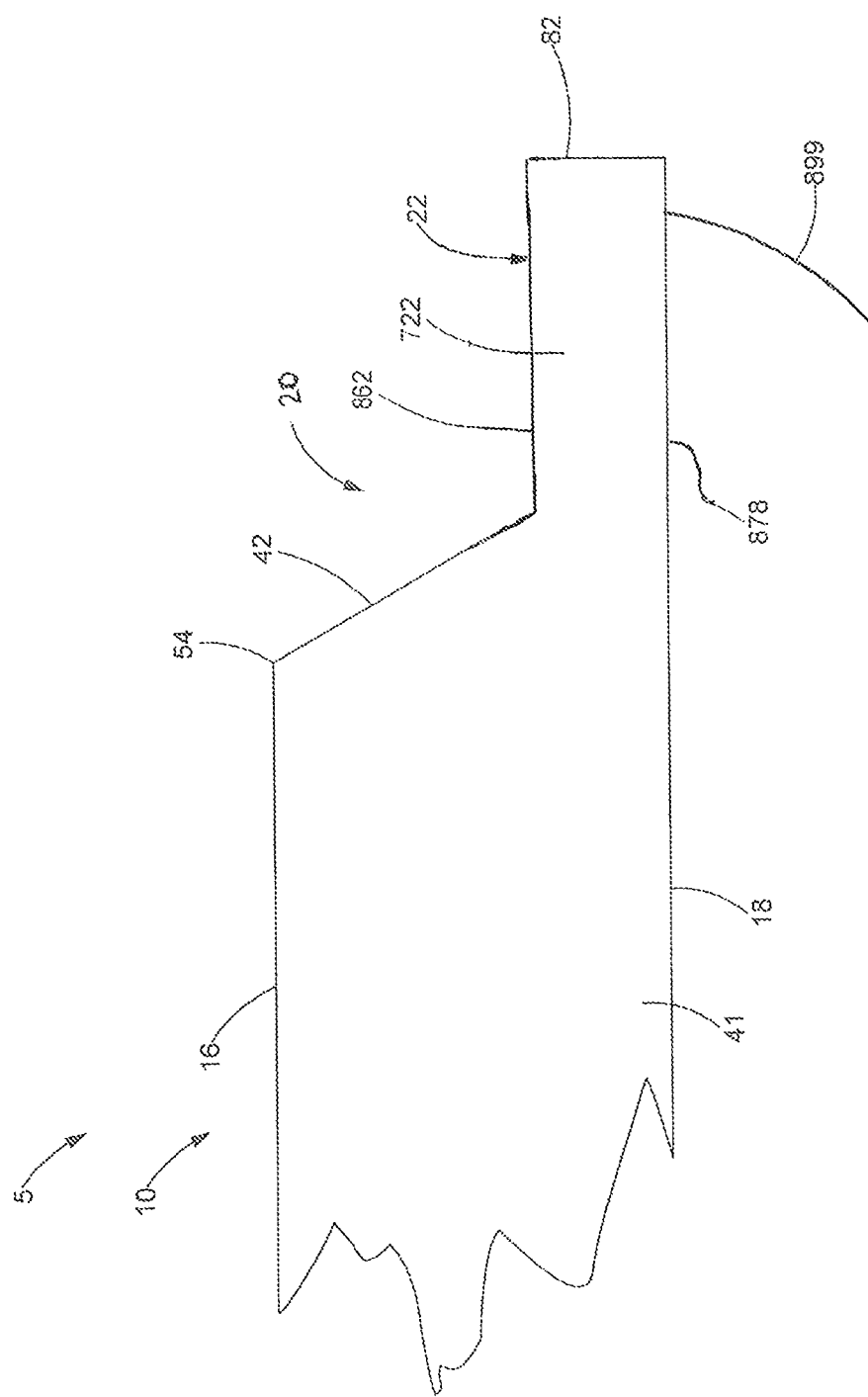
FIG. 11 is a side view depicting a method of manufacturing a structural member according to the exemplary embodiment of the present disclosure illustrated in FIG. 10.

FIG. 11 illustrates an exemplary method of manufacturing or fabricating a protrusion of a structural member (illustrated as protrusion 22 of the first structural member 10) embodied as an arcuate root protrusion 722. For certain applications, manufacturing constraints and/or requirements (or other circumstances which may be attendant thereto such as, e.g., material properties, costs, finishing requirements, among others) may introduce difficulties in incorporating geometries or features which may not be suited to or compatible with certain manufacturing, processing, or fabrication methods without introducing significant additional costs or difficulties. In particular, FIG. 11 shows the first structural member 10 including the arcuate root protrusion 722 in a pre-formed or initial state prior to the formation of the embodiment of the arcuate root protrusion 722 as shown in FIG. 10, wherein the pre-formed arcuate root protrusion 722 extending substantially linearly outward from the main body 41 of the first structural member 10 and the end portion 20 thereof, with the arcuate inner surface 878 of the arcuate root protrusion 722 aligned with the second surface 18 of the first structural member 10. The body 40 of the first structural member 10 may be formed to include the pre-formed arcuate root protrusion 722 as shown in FIG. 10 via one or more of any suitable manufacturing or fabrication processes, non-limiting examples include forming the body 40 of the first structural member 10 including the pre-formed arcuate root protrusion 722 via a casting process, or alternatively, the pre-formed arcuate root protrusion 722 may be formed by removing the material from the end of the body 40 of the first structural member 10 to leave the geometry of the pre-formed arcuate root protrusion 722 as shown in FIG. 10 via any suitable material removal process. Once formed, a force is applied to the pre-formed arcuate root protrusion 722 in the direction of the arrow 899 as shown in FIG. 11 such that the pre-formed arcuate root protrusion 722 bent, deformed, or urged downward by any suitable, known process, such as, for example, via a press, to form the arcuate root protrusion 722 as shown in FIG. 10.

Figure 12:
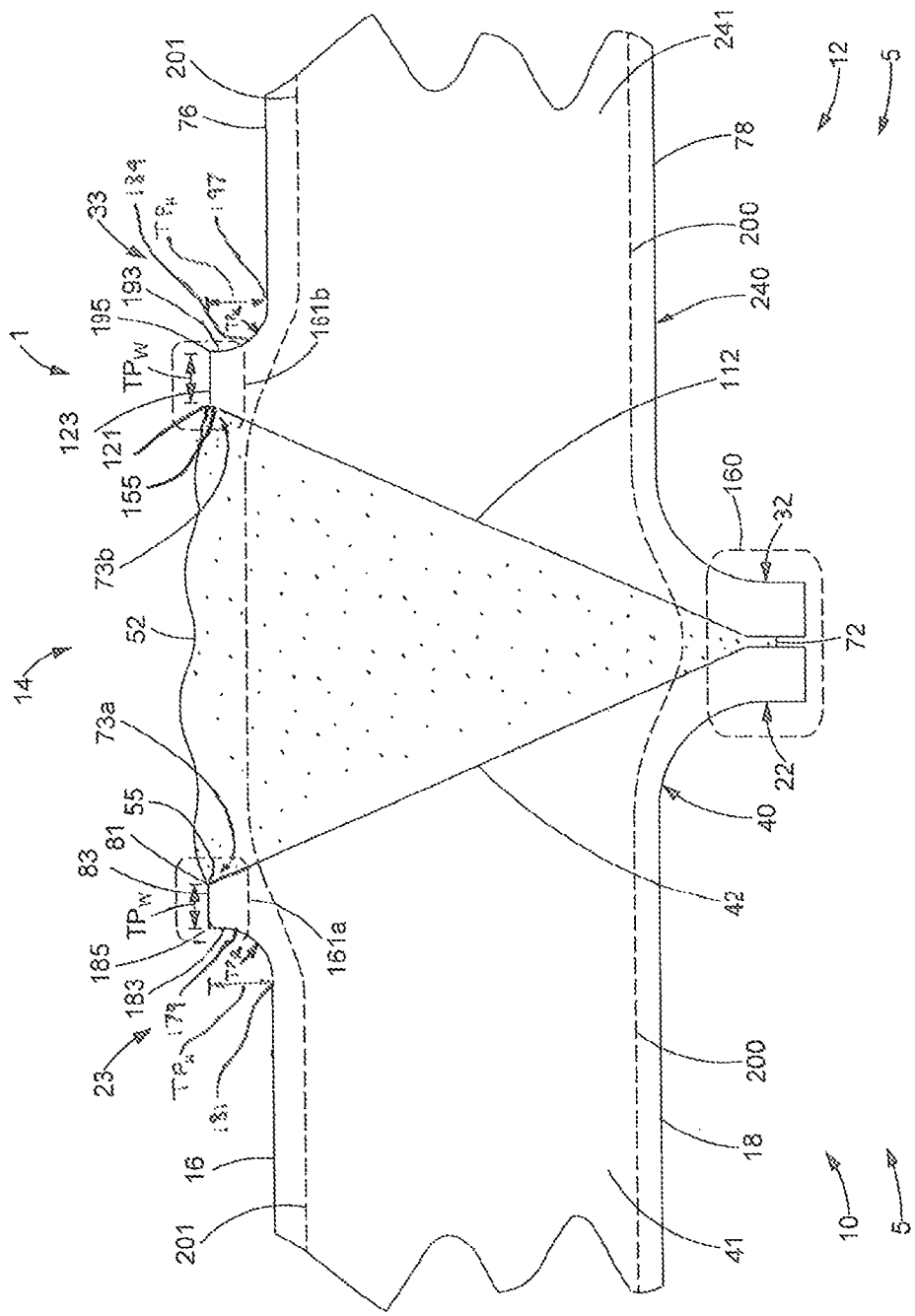
FIG. 12 is a side view of a structure formed by structural members joined by a groove weld according to an exemplary embodiment of the present disclosure.

FIG. 12 illustrates an additional embodiment of the structure 1 formed by two or more structural members 5, illustrated as first structural member 10 and second structural member 12, joined by a groove weld 14 which can include the root protrusions 22, 32 which form the stress protected weld root region 160 according to any one or more of the embodiments as discussed herein, and further includes toe protrusions 23, 33 which form stress protected weld toe regions 161a and 161b. In particular, with the exception of the differing and/or additional orientations, geometries and/or features as shown in the embodiment of FIG. 12 with respect to the toe protrusions 23, 33 which form stress protected weld toe regions 161a and 161b as discussed and identified herein, the embodiment of FIG. 12 otherwise includes and incorporate the elements, features and attributes of the disclosure of the embodiment of FIGS. 1-3 above therein. Equivalent to the embodiment of FIGS. 1-3, the end portion 20 of the first structural member 10 is defined by, and includes, in part, a terminal or end portion or segment of the first surface 16 and the second surface 18 which define an outer edge, side, extension, or boundary of the first structural member 10 (and the main body 41 thereof) configured to be placed adjacent to an end portion 30 of the second structural member 12, and the end portion 30 of the second structural member 12 is defined by, and includes, in part, a terminal or end portion or segment of the first surface 76 and the second surface 78 which define an outer edge, side, extension, or boundary of the second structural member 12 (and the main body 241 thereof) configured to be placed adjacent to an end portion 20 of the first structural member 10, and joined thereto via a groove weld 14 as illustrated in FIGS. 2 and 3. In the embodiment shown in FIG. 12, the end portion 20 of the first structural member 10 includes a toe protrusion 23 which extends beyond and protrudes outward (and upward) from the first surface 16 and is positioned above or as extending entirely beyond the outer linear boundary of the terminal end of the first surface 16 (and the main body 41 of the first structural member 10) proximate to the groove weld 14 and within the end portion 20 of the body 40 of the first structural member 10 such that the toe protrusion 23 defines and is positioned within a stress protected weld toe region 161a as further discussed herein. Similarly, the end portion 30 of the second structural member 12 includes a toe protrusion 33 which extends beyond and protrudes outward (and upward) from the first surface 76 and is positioned above or as extending entirely beyond the outer linear boundary of the terminal end of the first surface 76 (and the main body 241 of the second structural member 12) proximate to the groove weld 14 and within the end portion 30 of the body 240 of the second structural member 12 such that the toe protrusion 33 defines and is positioned within a stress protected weld toe region 161b.

As further discussed herein, one or more of the size, shape, and/or dimensions of the toe protrusions 23, 33 can be defined, at least in part, by the dimension of an arcuate inner surface 179, 189 (and in one embodiment, the radius $TP_R$ thereof) of the toe protrusions 23, 33 oriented on a side of the toe protrusions 23, 33 opposite the first ends 55, 155 of the end surfaces 42, 112 of the respective first and second structural members 10, 12. The arcuate inner surface 179 of the toe protrusion 23 of the first structural member 10 can be defined as a transition surface by which the toe protrusion 23 extends outwardly from, beyond, and above the first surface 16 and the main body 41 of the first structural member 10 and away from the toe stress flow path 201, and extends outward to an outer end 83 of the toe protrusion 23. In particular, the arcuate inner surface 179 of the toe protrusion 23 of the first structural member 10 extends radially outward from an initial radial end 181, which defines a terminal end of the first surface 16 (as well as a terminal end and outer, upper boundary of the main body 41 of the first structural member 10) which is oriented proximate to the groove weld 14 (as shown in FIGS. 2 and 3), along a radius $TP_R$, to a terminal radial end 183 of the arcuate inner surface 179 which can be at, or proximate to, and in one embodiment, vertically aligned with, an inner edge 185 of the outer end 83 of the toe protrusion 23. The radius $TP_R$ along which the arcuate inner surface 179 extends can define the dimension of the arcuate inner surface 179, and further can define, in part, the cross sectional width TPw of the toe protrusion 23 and the outer end 83 thereof. The outer end 83 of the toe protrusion 23 can define an outward-most boundary of the toe protrusion 23 of the first structural member 10 with respect to and extending away from the first surface 16 and the main body 41 of the first structural member 10, and extends between an inner edge 185 and an outer edge 81 of the toe protrusion 23. As above, the inner edge 185 of the outer end 83 of the toe protrusion 23 of the first structural member 10 can be positioned above, can be defined by, can be aligned with, or can be proximate to the outwardly extending terminal radial end 183 of the arcuate inner surface 179, and the outer edge 81 corresponds with the upper (or first) end 55 of the end surface 42 and forms the outermost boundary of the toe protrusion 23 (and the outer end 83 thereof) at the groove weld 14 and engages the filler material 52 and defines at least a portion of the weld toe 73a at the upper end of the groove weld 14 at which the filler material 52 engages the first structural member 10, and end surface 42 thereof within the stress protected weld toe region 161a.

The arcuate inner surface 189 of the toe protrusion 33 of the second structural member 12 can be defined as a transition surface by which the toe protrusion 33 extends outwardly from, beyond, and above the first surface 76 and the main body 241 of the second structural member 12 and away from the toe stress flow path 201, and extends outward to an outer end 123 of the toe protrusion 33 which can define an outward-most boundary of the toe protrusion 33 of the second structural member 12 with respect to and extending away from the first surface 76 and the main body 241 of the second structural member 12. In particular, the arcuate inner surface 189 of the toe protrusion 33 of the second structural member 12 extends radially outwardly from an initial radial end 197, which defines a terminal end of the first surface 76 (as well as a terminal end and outer, upper boundary of the main body 241 of the second structural member 12) which is oriented proximate to the groove weld 14 (as shown in FIGS. 2 and 3), along a radius $TP_R$, to a terminal radial end 193 of the arcuate inner surface 189 which can be at, or proximate to, and in one embodiment, vertically aligned with, an inner edge 195 of the outer end 123 of the toe protrusion 33. The radius $TP_R$ along which the arcuate inner surface 189 extends can define the dimension of the arcuate inner surface 189, and further can define, in part, the cross sectional width TPw of the toe protrusion 33 and the outer end 123 thereof. The outer end 123 of the toe protrusion 33 can define an outward-most boundary of the toe protrusion 33 of the second structural member 12 with respect to and extending away from the first surface 76 and the main body 241 of the second structural member 12, and extends between an inner edge 195 and an outer edge 121 of the toe protrusion 33. As above, the inner edge 195 of the outer end 123 of the toe protrusion 33 of the second structural member 12 can be positioned above, can be defined by, can be aligned with, or can be proximate to the outwardly extending terminal radial end 193 of the arcuate inner surface 189, and the outer edge 121 of the toe protrusion 33 of the second structural member 12 corresponds with the upper (or first) end 155 of the end surface 112 and forms the outermost boundary of the toe protrusion 33 (and the outer end 123 thereof) at the groove weld 14 and engages the filler material 52 and defines at least a portion of the weld toe 73b at the upper end of the groove weld 14 at which the filler material 52 engages the second structural member 12, and end surface 112 thereof within the stress protected weld toe region 161b.

The toe protrusion 23 of the first structural member 10 includes a cross sectional width TPw which can be defined as the horizontal linear distance between the inner edge 185 of the outer end 83 of the toe protrusion 23 (and/or the terminal radial end 183 of the arcuate inner surface 179) and the outer edge 81 of the toe protrusion 23 which forms the upper (or first) end 55 of the end surface 42 and engages the filler material 52 and defines at least a portion of the weld toe 73a at the upper end, or toe portion of the groove weld 14 at a position beyond, outward from, and above the outer, upper linear boundary of the main body 41 of the first structural member 10 defined by the terminal end of the first surface 16 (and the main body 41 of the first structural member 10) proximate to the groove weld 14 such that the weld toe 73a is positioned within a stress protected weld toe region 161a and isolated outward from and above the toe stress flow path 201.

Similarly, toe protrusion 33 of the second structural member 12 includes a cross sectional width TPw can be defined as the horizontal linear distance between the inner edge 195 of the outer end 122 of the toe protrusion 33 (and/or the terminal radial end 193 of the arcuate inner surface 189) and the outer edge 121 of the toe protrusion 33 which forms the upper (or first) end 155 of the end surface 112 which engages the filler material 52 and the weld toe 73b at the upper end, or toe portion of the groove weld 14 at a position beyond, outward from, and above the outer, upper linear boundary of the main body 241 of the second structural member 12 defined by the terminal end of the first surface 76 (and the main body 241 of the second structural member 12) proximate to the groove weld 14 such that the weld toe 73b is positioned within a stress protected weld toe region 161b and isolated outward from and above the toe stress flow path 201.

In one embodiment, the radius $TP_R$ of the arcuate inner surface 179 of the toe protrusion 23 of the first structural member 10 and the radius $TP_R$ of the arcuate inner surface 189 of the toe protrusion 33 of the second structural member 12 can be substantially constant, or alternatively can be variable. The dimension of the arcuate inner surface 179 (and in one embodiment, the radius $TP_R$ thereof) of the toe protrusion 23 of the first structural member 10, can further define, in part, the toe protrusion height $TP_H$ which is the linear distance at which the toe protrusion 23 extends outward and upward from, above, and beyond the outer boundary of the first structural member 10 (and the main body 41 thereof) defined by the first surface 16. This is defined as the distance extending linearly and vertically outward and upward from and beyond the initial radial end 181 of the arcuate inner surface 179 (and/or the terminal end of the first surface 16) to the outer end 83 of the toe protrusion 23. The dimension of the arcuate inner surface 189 (and in one embodiment, the radius $TP_R$ thereof) of the toe protrusion 33 of the second structural member 12 can further define, in part, the toe protrusion height $TP_H$ which is the linear distance at which the toe protrusion 33 extends outward and upward from, above, and beyond the outer boundary of the second structural member 12 (and the main body 241 thereof) defined by the first surface 76. This is defined as the distance extending linearly and vertically outward and upward from and beyond the initial radial end 197 of the arcuate inner surface 189 (and/or the terminal end of the first surface 76) to the outer end 123 of the toe protrusion 33.

The axial, tensile and bending loading paths and stress concentrations of the toe stress flow path 201 propagated through the first structural member 10 and the second structural member 12 is illustrated in FIG. 12. As further discussed herein with reference to FIGS. 16-18, the geometry and relative dimensions of the radius $TP_R$ of the arcuate inner surfaces 179, 189, the toe protrusion height $TP_H$, and the width of the $TP_W$ of the toe protrusions 23, 33 of the first and second structural members 10, 12 are selected and configured to engage the filler material 52 of the groove weld 14 to define, form, locate, and isolate the respective weld toes 73a, 73b within stress protected weld toe regions 161a, 161b outward, beyond, upward, and away from the toe stress flow path 201 and to deflect, alter, and redirect and isolate the toe stress flow path 201 within the main body 41 of the first structural member 10 and the main body 241 of the second structural member 12, and the parent material thereof, and away from the stress protected weld toe regions 161a, 161b as well as the respective weld toes 73a, 73b located therein. As a result of the geometry and relative dimensions of the radius $TP_R$ of the arcuate inner surfaces 179, 189, the toe protrusion height $TP_H$, and the width of the $TP_W$ of the toe protrusions 23, 33 of the first and second structural members 10, 12 the toe stress flow path 201 is applied to, transferred through, and/or propagated through the structure and weldment away from, below, or inward with respect to the respective weld toes 73a, 73b and the location thereof within the stress protected weld toe regions 161a, 161b, toward and within the main body 41 and the main body 241 of the first and second structural members 10, 12 with respect to the respective weld toes 73a, 73b within stress protected weld toe regions 161a, 161b to the stronger parent material of the main body 41 and the main body 241 of the first and second structural members 10, 12. Accordingly, the respective weld toes 73a, 73b are located, retained and secured within the stress protected weld root region 160 by the upward and outward extending toe protrusions 23, 33 and above main body 41 and the main body 241 of the first and second structural members 10, 12 at a location beyond and away from the toe stress flow path 201. The bond formed between the filler material 52 and first and second structural members 10, 12 and proximate to the respective weld toes 73a, 73b within stress protected weld toe regions 161a, 161b is isolated from such load paths and stress concentrations and is positioned in a negligible stress concentration zone such that fatigue failure does not occur in one or more of the respective weld toes 73a, 73b and the stress protected weld toe regions 161a, 161b.

The end portion 20 and toe protrusion 23, as well as the geometries and dimensions thereof as discussed herein, of the first structural member 10 as disclosed herein (as well as the end portion 30 and toe protrusion 33 of the second structural member 12) can be formed using any suitable metal fabrication process or processes, which may depend upon the type, use, application, constraints, or other considerations attendant to the resulting structure. In one embodiment, the entirety of the body 40 of the first structural member 10 (as well as the body 240 of the second structural member 12) can be formed via a casting process such that one or more ends, outer edges, extensions, or boundaries of the first structural member 10 include the end portion 20 and toe protrusion 23, as well as the geometries and dimensions thereof and are mutually formed and included as the result of a single casting process. Alternatively, the end portion 20 and toe protrusion 23 of the first structural member 10 can be formed via one or more rolling, forging, extrusion, bending, machining, and/or additive manufacturing processes, such as metallic 3D printing fabrication processes. It is further contemplated that the end portion 20 and toe protrusion 23 of the first structural member 10 may be formed by a combination of two or more fabrication processes, such as casting, rolling, forging, extension, bending, machining, and/or additive manufacturing processes, such as metallic 3D printing fabrication processes. The foregoing disclosure and embodiments, although discussed with respect to the first structural member 10, apply equally with respect to the second structural member 20.

INDUSTRIAL APPLICABILITY

The present disclosure may be applicable to any structure 1 composed of at least two structural members 5 joined by at least one groove weld, and more particularly, the present disclosure may be applicable to any type of structural member, component, part, structure, and/or body which is capable of being joined to any other structural member, component, part, structure, and/or body via a groove weld, to form a weldment and resultant structure including the joined structural members. Aspects of the disclosed structure having a stress protected groove weld and structural members forming the same may significantly reduce or eliminate damage, fatigue, or failure within the groove weld (including, in part, the adjacent and/or mating edges or surfaces of the structural members which are engaged and in thermal proximity with the groove weld, and the filler material thereof, which are mutually thermally bonded and transformed via the energy of the groove weld) which may be caused by cyclic loading, forces and/or stresses, which may include, in part, tensile or bending forces that produce stresses on the weld.

Groove welds may be widely used as an effective means by which structural members are joined to form a wide variety of numerous different types of structures. As provided above, for the purposes of the present disclosure, the term "welding" (or "weld"), includes any process or the result thereof wherein two structural members or other metal components are joined together by the affixation of adjacent and/or mating edges or surfaces as a result of a mutual thermal bonding transformation therebetween. A structure formed by two or more structural members, components, parts, structures, and/or bodies (or "a weldment") may be generally characterized as including the pre-existing, or "parent" material of the structural members and the material (such as the filler material) and/or the mutually thermally bonded surfaces of the structural members which form the groove weld and are bonded thereby. The formed structure may experience or may be subjected to any of a wide variety of forces and/or stresses (such as, e.g., dynamic, static, and/or cyclic loading) which may include, in part, tensile or bending forces that produce stresses on the weld and structural members depending upon the type, use, application, environment, or various other considerations attendant to the resulting structure.

While the pre-existing, or "parent" material of the structural members may be susceptible to damage or failure caused by any such forces and/or stresses (depending upon a variety of considerations or factors, which may include, in part, the material composition of the pre-existing, or "parent" material of the structural members), such pre-existing, or "parent" material may be stronger than, and may be capable of absorbing or withstanding a comparatively greater amount of force and/or stress without experiencing fatigue or failure than the groove weld. As such, when loading, forces, and/or stresses are applied to the structure including the parent material of the structural members and the groove weld, the groove weld may represent the portion or area of the joined structure which may be most likely to experience, or may be most susceptible to, stress, fatigue, damage, and/or failure, and such stress, fatigue, damage, and/or failure may thus compromise the overall durability, strength, and/or integrity of the joined structure. In particular, certain portions or areas of the groove weld, such as the root and/or toe thereof, may represent those portion or areas of the groove weld which may be particularly susceptible to fatigue or failure and may be incapable of absorbing and withstanding loading, forces, and/or stresses applied thereto. As discussed above and further disclosed herein, the structural members including any one or more of the protected geometries and features according to any one or more of the embodiments of the present disclosure, may form groove welds, as well as resultant structures formed, at least in part, thereby, which may present significant advantages over conventional, known groove welds and by significantly improving, if not overcoming, the disadvantages associated with loading, forces, stresses, fatigue, and/or failure.

Figure 13:
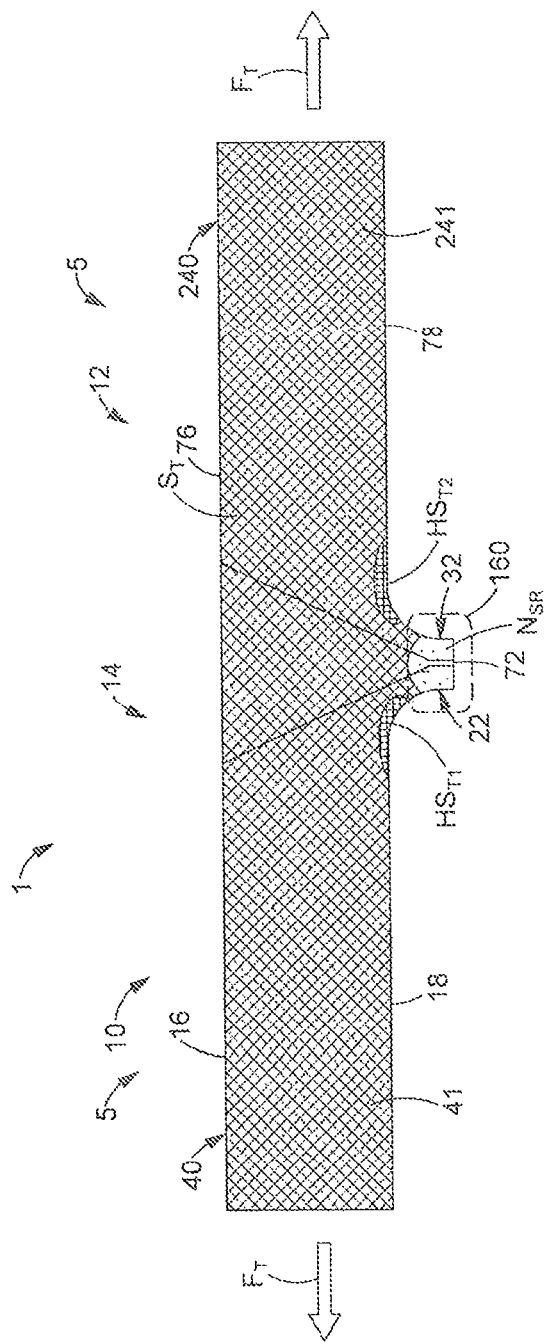
FIG. 13 is a schematic illustration of a stress simulation analysis depicting stress regions formed within the structure formed by structural members joined by a groove weld as a result of tensile stress applied to the structure according to the present disclosure.
Figure 14:
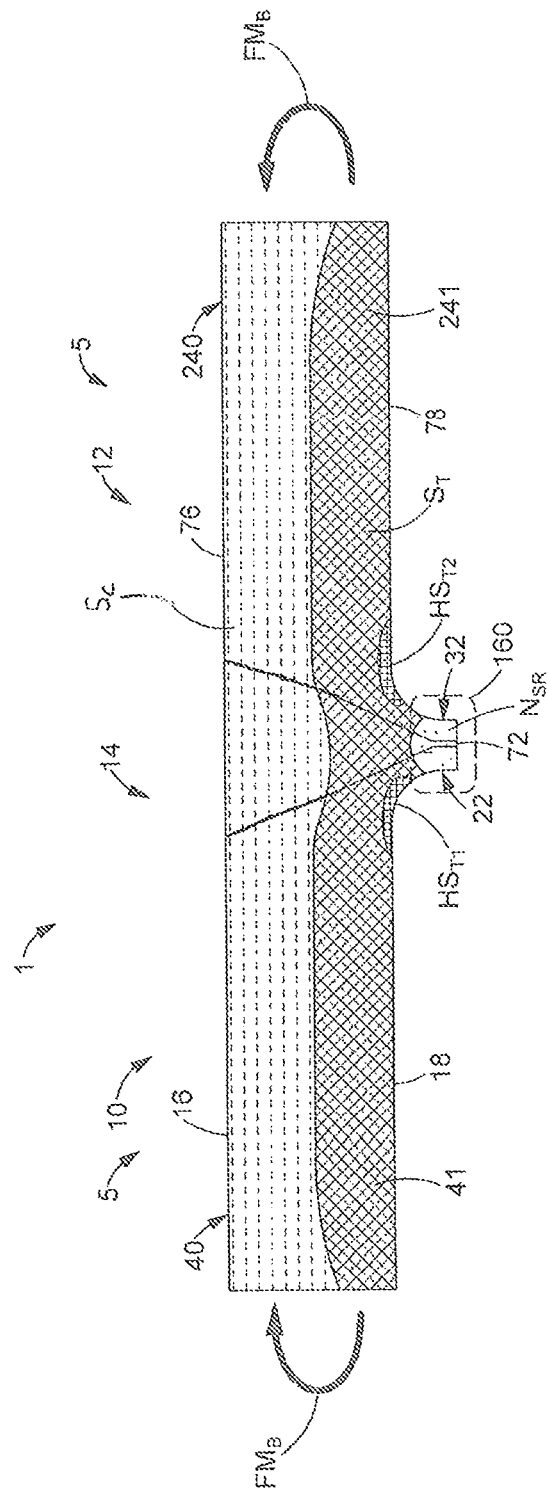
FIG. 14 is a schematic illustration of a stress simulation analysis depicting stress regions formed within the structure formed by structural members joined by a groove weld as a result of bending stress applied to the structure according to the present disclosure.

FIGS. 13-14 are schematic illustrations of a stress simulation analysis depicting stress regions formed within the structure 1 formed by structural members 5 including root protrusions 22, 32 and joined by a groove weld 14 according to any one or more of the embodiments as disclosed herein. In particular, FIG. 13 illustrates stress regions formed within the structure 1 as a result of tensile stress applied to the structure 1 formed by structural members 5 including root protrusions 22, 32 and joined by a groove weld 14 according to any one or more of the embodiments as disclosed herein. The tensile stress force ($F_T$) applied to the structure 1 is illustrated as the force $F_T$ applied to the structure 1 in the direction of the arrows associated therewith as shown in FIG. 13. FIG. 13 (as well as FIGS. 14, 16, 17, & 18) further illustrates various stress regions that may be created within and experienced by the structure 1 when experiencing tensile stress force $F_T$ (as well as bending moment stress force ($FM_B$) (FIG. 14), tensile stress force $F_T$ (FIG. 16), bending moment stress force ($FM_{B1}$) (FIG. 17) and bending moment stress force ($FM_{B2}$) (FIG. 18), respectively) and more specifically, FIG. 13 illustrates various stress regions which are defined and illustrated to depict the type of stress force, the location of the particular type of stress force, and the magnitude of the particular type of stress force at the particular location which may be formed within the bodies 40, 240 of the first and second structural members 10, 12 as well as the groove weld 14 as a result of the application of the tensile stress force $F_T$ to the structure 1. As illustrated in FIG. 13, the application of the tensile stress force $F_T$ to the structure 1 results in the creation of a tensile stress region ($S_T$) within the area of the bodies 40, 240 of the first and second structural members 10, 12 as well as the groove weld 14 illustrated as the area thereof designated $S_T$. FIG. 13 further illustrates that the application of the tensile stress force $F_T$ to the structure 1 may result in the creation of a first high tensile stress region ($HS_{T1}$) illustrated as the area thereof designated $HS_T$ (wherein the tensile stress force within the tensile stress region ($HS_T$) may be greater than, or may be significantly greater than the tensile stress force within the tensile stress region ($S_T$) ($HS_T \gg S_T$)), which may be formed and located within the main body 41 of the first structural member 10 proximate to the terminal end of the second surface 18 and extend into and along a portion of the arcuate inner surface 178 of the protrusion 22 proximate to the initial radial end 180 thereof, as well as the creation of a second high tensile stress region ($HS_{T2}$) which may be formed and located within the main body 241 of the second structural member 12 proximate to the terminal end of the second surface 78 and extend into and along a portion of the arcuate inner surface 188 of the protrusion 32 proximate to the initial radial end 196 thereof. Finally, FIG. 13 illustrates that an area of zero or negligible stress, or a zero or negligible root stress region ($N_{SR}$) illustrated as the area thereof designated $N_{SR}$ may be created or may exist within the structure 1 while (or despite that) the tensile stress force $F_T$ is applied to the structure 1. For the purposes of the present disclosure "zero or negligible root stress region" and "zero or negligible toe stress region" are defined as a regions within the structure 1 within which or to which little or no appreciable fatigue inducing stress or stress force(s) is/are applied, transferred, propagated, or experienced from the particular type of stress which is being applied to the overall structure 1. As shown in the schematic illustration of FIG. 13 (and incorporating by reference the reference numbers shown in FIGS. 1-3 (as well as FIGS. 3-10) and discussed above), during the application of the tensile stress force $F_T$ to the structure 1, a zero or negligible root stress region ($N_{SR}$) is formed and located within an area of the protrusions 22, 32 extending downward or outward from at or near the terminal radial ends 182, 192 of the arcuate inner surfaces 178, 188, toward, and beyond the outer ends 82, 122 of the respective protrusions 22, 32, and throughout the resulting total weld root protrusion width WRPw including the width RPw of the of the root protrusion 22 of the first structural member 10 and the width RPw of the root protrusion 32 of the second structural member 12. As such, the zero or negligible root stress region ($N_{SR}$) is formed and located within the area defined and illustrated in the embodiments of the present disclosure as corresponding to the stress protected weld root region 160 within which the weld root 72 is located. Furthermore, as discussed above, the geometry and relative dimensions of the radius $RP_R$ of the arcuate inner surfaces 178, 188, the root protrusion height $RP_H$, and the width RPw of the of the root protrusion 22 of the first structural member 10 and the root protrusion 32 of the second structural member 12, respectively, as well as the resulting total weld root protrusion width WRPw of any embodiments as disclosed herein (as illustrated in, consistent with, and incorporating by reference the reference numbers shown in FIGS. 1-3 (as well as FIGS. 3-10) and discussed above) are selected and configured to define, form, locate, and isolate the weld root 72 within a stress protected weld root region 160 outward, beyond, below, and away from the root stress flow path 200, which corresponds with and can be defined as a negligible root stress region ($N_{SR}$) within which or to which little or no appreciable fatigue inducing tensile stress force $F_T$ is applied, propagated, experienced, or transferred. FIG. 13 thus illustrates the effectiveness of the geometry of the protrusions 22, 32 in the structure 1 as disclosed herein. When the tensile stress force $F_T$ is applied to the structure 1, the parent material of the bodies 41, 241 of the structural members 5 is stressed. Whereas this tensile stress is increased near the radius of the protrusions 22, 32, a negligible root stress region ($N_{SR}$) corresponding to the stress protected weld root region 160 is created. When the root of the weld is located in this negligible root stress region ($N_{SR}$) corresponding to the stress protected weld root region 160, fatigue will not initiate from the weld root 72. Although the parent material in the radius experiences higher stress, the overall fatigue life of the welded structure is still significantly increased.

Figure 18:
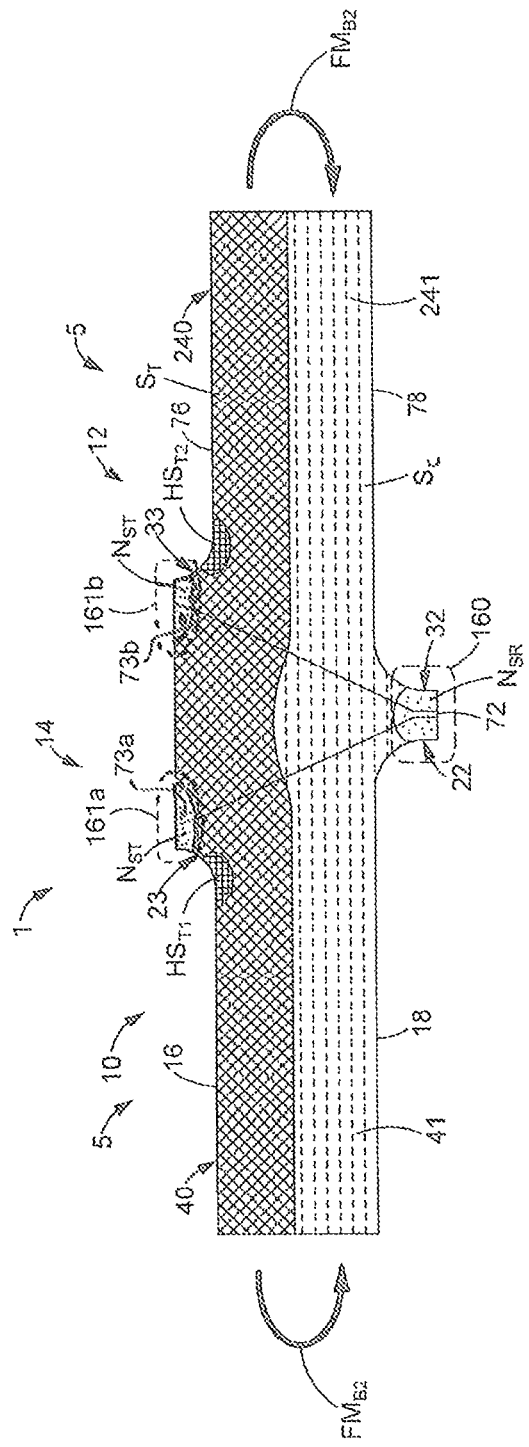
FIG. 18 is a schematic illustration of a stress simulation analysis depicting stress regions formed within the structure formed by structural members joined by a groove weld as a result of bending stress applied to the structure in a second direction according to the present disclosure.

Referring to FIG. 14, stress regions formed within the structure 1 as a result of bending moment stress applied to the structure 1 formed by structural members 5 including root protrusions 22, 32 and joined by a groove weld 14 according to any one or more of the embodiments as disclosed herein. The bending moment stress force ($FM_B$) applied to the structure 1 is illustrated as the force $FM_B$ applied to the structure 1 in the direction of the arrows associated therewith as shown in FIG. 14 such that the bottom portion (proximate to the second surfaces 18, 78) of the structure 1 may generally be placed in tension, and FIG. 14 illustrates the various stress regions which are defined and illustrated to depict the type of stress force, the location of the particular type of stress force, and the magnitude of the particular type of stress force at the particular location which may be formed within the bodies 40, 240 of the first and second structural members 10, 12 as well as the groove weld 14 as a result of the application of the bending moment stress force $FM_B$ to the structure 1. As illustrated in FIG. 14, the application of the bending moment stress force $FM_B$ to the structure 1 results in the creation of a compressive stress force region ($S_C$) within the area of the bodies 40, 240 of the first and second structural members 10, 12 as well as the groove weld 14 illustrated as the area thereof designated $S_C$ which may be formed and located within an upper portion of the main bodies 41, 241 of the first and second structural members 10, 12 generally extending from the central medial axes 60, 160 to the first surfaces 16, 76 thereof. FIG. 14 further illustrates that the application of the bending moment stress force $FM_B$ to the structure 1 results in the creation of a tensile stress region ($S_T$) within the area of the bodies 40, 240 of the first and second structural members 10, 12 as well as the groove weld 14 illustrated as the area thereof designated $S_T$ which may be formed and located within a lower portion of the main bodies 41, 241 of the first and second structural members 10, 12 generally extending from the central medial axes 60, 160 to the second surfaces 18, 78 thereof. FIG. 14 further illustrates that the application of the bending moment stress force $FM_B$ to the structure 1 may result in the creation of a first high tensile stress region ($HS_{T1}$) illustrated as the area thereof designated $HS_{T1}$, which may be formed and located within the main body 41 of the first structural member 10 proximate to the terminal end of the second surface 18 and extend into and along a portion of the arcuate inner surface 178 of the protrusion 22 proximate to the initial radial end 180 thereof, as well as the creation of a second high tensile stress region ($HS_{T2}$) which may be formed and located within the main body 241 of the second structural member 12 proximate to the terminal end of the second surface 78 and extend into and along a portion of the arcuate inner surface 188 of the protrusion 32 proximate to the initial radial end 196 thereof. Finally, and similar to and substantially consistent with the application of the tensile stress force $F_T$ to the structure 1 as shown in FIG. 13 and discussed above (and incorporating by reference the reference numbers shown in FIGS. 1-3 (as well as FIGS. 3-10) and discussed above), during the application of the bending moment stress force $FM_B$ to the structure 1, a zero or negligible root stress region ($N_{SR}$) is formed and located within an area of the protrusions 22, 32 extending downward or outward from at or near the terminal radial ends 182, 192 of the arcuate inner surfaces 178, 188, toward, and beyond the outer ends 82, 122 of the respective protrusions 22, 32, and throughout the resulting total weld root protrusion width WRPw including the width of the RPw of the root protrusion 22 of the first structural member 10 and the width RPw of the root protrusion 32 of the second structural member 12. As such, the geometry and relative dimensions of the radius $RP_R$ of the arcuate inner surfaces 178, 188, the root protrusion height $RP_H$, and the width RPw of the of the root protrusion 22 of the first structural member 10 and the root protrusion 32 of the second structural member 12, respectively, as well as the resulting total weld root protrusion width WRPw of any embodiments as disclosed herein (as shown, in part, in and consistent with FIGS. 1-10) are selected and configured to define, form, locate, and isolate the weld root 72 within a stress protected weld root region 160 outward, beyond, below, and away from the root stress flow path 200, which corresponds with and can be defined as a negligible root stress region ($N_{SR}$) within which or to which little or no appreciable fatigue inducing bending moment stress force $FM_B$ is applied, propagated, experienced, or transferred. Thus, whereas the tensile stress is increased near the radius of the protrusion 22, 32, a negligible root stress region ($N_{SR}$) corresponding to the stress protected weld root region 160 is still created when the bending moment is applied. Therefore, similarly to the tensile force application, when the weld root 72 is located in negligible root stress region ($N_{SR}$) corresponding to the stress protected weld root region 160, fatigue will not initiate from the weld root 72. Also similarly, although the parent material (body of the structure) experiences higher stress at the radius area, the overall fatigue life of the welded structure is still significantly increased. Similarly, if the bending moment in FIG. 14 were reversed, such that the bottom portion of the structure 1 was in compression, the zero or negligible root stress region ($N_{SR}$) (stress protected weld root region 160) is still created and the overall fatigue life of the welded structure is significantly increased (as shown in FIG. 18). Similarly, when a tubular structure that contains the protrusion geometry is subjected to a torsional load, a zero or negligible root stress region ($N_{SR}$) (stress protected weld root region 160) is still created and the overall fatigue life of the welded structure is significantly increased. The zero or negligible root stress region ($N_{SR}$) (stress protected weld root region 160) illustrated in FIGS. 13 and 14 may occur in welded structures having a variety of bodies, including castings, forgings, plates, sections, and tubes, and under a variety of loading types, with the protrusion geometry included in the welded structure.

Figure 15:
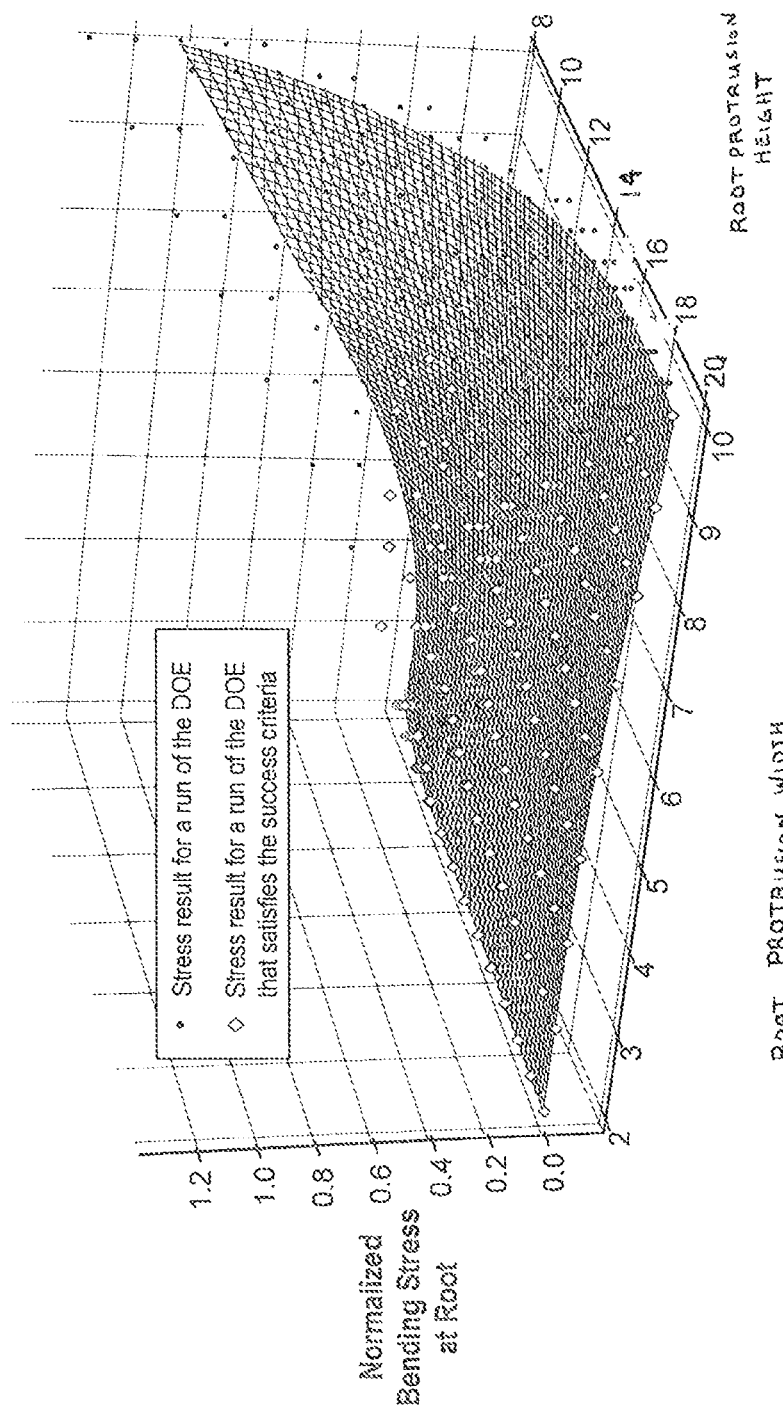
FIG. 15 is a four dimensional graphical representation depicting the relationships between root stress, protrusion height, protrusion width, and protrusion radius according to the present disclosure.

Referring to FIG. 15, a four-dimensional plot illustrates the root stress relative to the root protrusion width RPw, root protrusion height $RP_H$, and root protrusion radius $RP_R$. Example root protrusion width RPw & root protrusion height $RP_H$ dimensions are located along the horizontal axes. For each combination of root protrusion width RPw & root protrusion height $RP_H$, there are five calculated weld root bending stress values (shown as five distinct dots having some vertical separation) which correspond to five distinct protrusion radius dimensions. The overall contour plot connects the mid-point of the five calculated bending stress values to illustrate combinations of root protrusion width RPw, root protrusion height $RP_H$, and root protrusion radius $RP_R$ that effectively produce zero (or negligible) stress at the weld root 72 within the zero or negligible root stress region ($N_{SR}$) (stress protected weld root region 160). As illustrated, the left region of the contour plot is generally flat, meaning the root stress is zero (or negligible) for a variety of combinations of root protrusion width RPw, root protrusion height $RP_H$, and root protrusion radius $RP_R$. With such combinations of protrusion width, protrusion height, and protrusion radius (RPw, $RP_H$, and $RP_R$) fatigue will not initiate from the weld root and the overall fatigue life of the welded structure will significantly increase.

Figure 16:
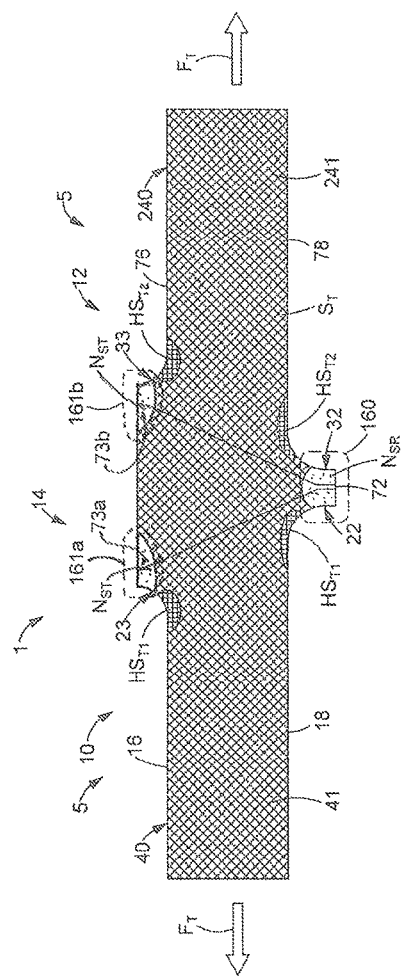
FIG. 16 is a schematic illustration of a stress simulation analysis depicting stress regions formed within the structure formed by structural members joined by a groove weld as a result of tensile stress applied to the structure according to the present disclosure.
Figure 17:
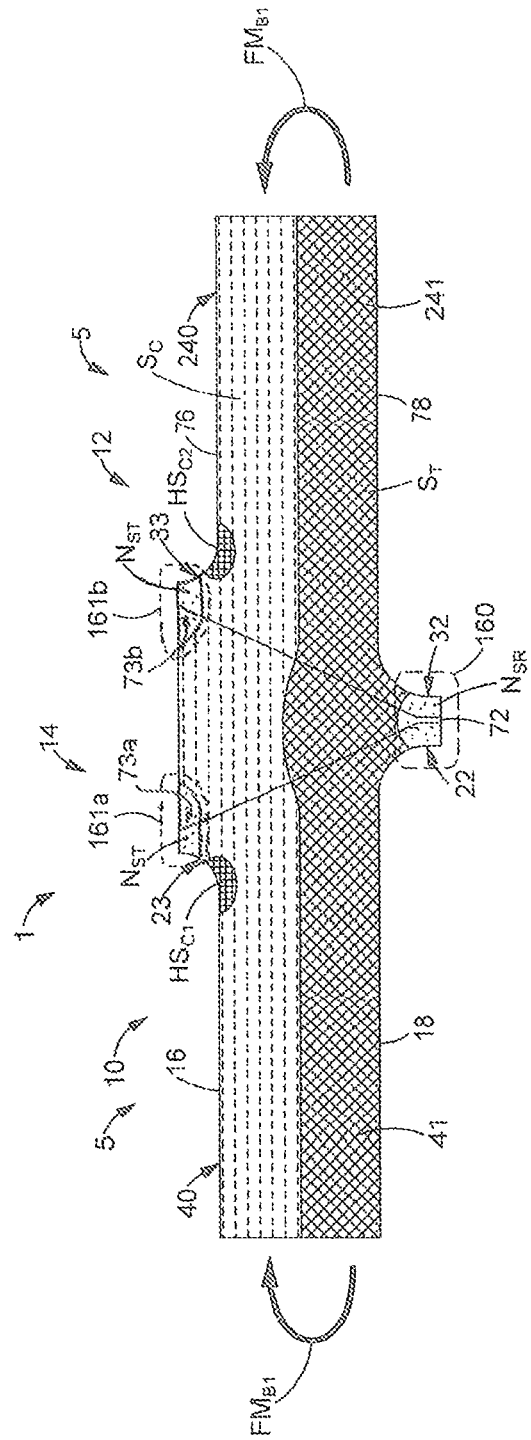
FIG. 17 is a schematic illustration of a stress simulation analysis depicting stress regions formed within the structure formed by structural members joined by a groove weld as a result of bending stress applied to the structure in a first direction according to the present disclosure.

FIGS. 16-18 are schematic illustrations of a stress simulation analysis depicting stress regions formed within the structure 1 formed by structural members 5 including root protrusions 22, 32 and further including toe protrusions 23, 33, joined by a groove weld 14 according to any one or more of the embodiments as disclosed herein. In particular, FIGS. 16-18 illustrates stress regions formed within the structure 1 as a result of tensile stress force $F_T$, bending moment stress force ($FM_{B1}$), and bending moment stress force ($FM_{B2}$), respectively, applied to the structure 1 formed by structural members 5 including root protrusions 22, 32 and further including toe protrusions 23, 33 joined by a groove weld 14 according to any one or more of the embodiments as disclosed herein. The stress regions as shown in FIGS. 16-18 experienced within the structure 1, and notably, a negligible root stress region ($N_{SR}$) created in the area of the root protrusions 22, 32 corresponding to the stress protected weld root region 160, are substantially consistent with those as produced as a result of the respective tensile stress force $F_T$, bending moment stress force $FM_B$ as illustrated (and/or discussed above with reference to) FIGS. 13-14. However, FIGS. 16-18 further illustrate stress regions associated with and experienced by and formed within the upper portion of the structure 1, including the toe protrusions 22, 32, thereof.

In particular, FIGS. 16-18 illustrate that the application of the tensile stress force $F_T$, the bending moment stress force (first direction) $FM_{B1}$, and the bending moment stress force (second direction) $FM_{B2}$ to the structure 1 may result in the creation of first and second high tensile stress regions ($HS_{T1}$, $HS_{T2}$) illustrated as the areas thereof designated $HS_{T1}$, $HS_{T2}$, first and second high compressive stress regions ($HS_{C1}$, $HS_{C2}$) illustrated as the areas thereof designated $HS_{C1}$, $HS_{C2}$, and first and second high tensile stress regions ($HS_{T1}$, $HS_{T2}$) illustrated as the areas thereof designated $HS_{T1}$, $HS_{T2}$, respectively, which may be formed and located within the main bodies 41, 241 of the first and second structural members 10, 12 proximate to the terminal ends of the first and second surfaces 16, 76 and may extend into and along a portion of the arcuate inner surfaces 179, 189 of the toe protrusions 23, 33 proximate to the initial radial ends 181, 197 thereof, respectively.

FIGS. 16-18 further illustrate that areas of zero or negligible stress, or zero or negligible toe stress regions ($N_{ST}$) illustrated as the areas thereof designated $N_{ST}$ may be created or may exist within the structure 1 while (or despite that) the each of the tensile stress force $F_T$, the bending moment stress force (first direction) $FM_{B1}$, and the bending moment stress force (second direction) $FM_{B2}$ are applied to the structure 1. As shown in the respective schematic illustrations of FIGS. 16-18 (which incorporate by reference the reference numbers shown in FIG. 12 and discussed above), during the application of the tensile stress force $F_T$, the bending moment stress force (first direction) $FM_{B1}$, and the bending moment stress force (second direction) $FM_{B2}$, zero or negligible toe stress regions ($N_{ST}$) are formed and located within an area of the toe protrusions 23, 33 extending upward or outward from an upper or outer portion of the arcuate inner surfaces 179, 189 which may be between the midpoint of each arcuate inner surfaces 179, 189 but not beyond the terminal radial ends 183, 193 thereof, toward, and beyond the outer ends 83, 123 of the respective toe protrusions 23, 33, and throughout the widths RPw of the toe protrusions 23, 33 in addition to the regions which define the weld toes 73a, 73b including the upper portions of the groove weld 14 including the portions of the filler material 52 proximate to (and surrounding) the outer edges 81, 121 of the toe protrusions 23, 33 and extending inward toward the interior groove weld 14 proximate thereto (a width of which may be at least equal to the widths RPw of the toe protrusions 23, 33). As such, the zero or negligible toe stress regions ($N_{ST}$) are formed and located within the areas defined and illustrated in the embodiments of the present disclosure as corresponding to the stress protected weld toe regions 161a, 161b within which the toes 73a, 73b are is located. Furthermore, as discussed above, the geometry and relative dimensions of the radius $TP_R$ of the arcuate inner surfaces 179, 189, the toe protrusion height $TP_H$, and the width of the $TP_W$ of the toe protrusions 23, 33 of the first and second structural members 10, 12 are selected and configured to engage the filler material 52 of the groove weld 14 to define, form, locate, and isolate the respective weld toes 73a, 73b within stress protected weld toe regions 161a, 161b positioned outward, beyond, upward, and away from the toe stress flow path 201 (as illustrated in FIG. 12 and consistent with, and incorporating the discussion thereof above), wherein each of the stress protected weld toe regions 161a, 161b correspond with and can be defined as zero or negligible toe stress regions ($N_{ST}$) within which or to which little or no appreciable fatigue inducing the tensile stress force $F_T$, bending moment stress force (first direction) $FM_{B1}$, or bending moment stress force (second direction) $FM_{B2}$ is applied, propagated, experienced, or transferred.

As discussed above, and as further illustrated and disclosed in the schematic and graphical illustrations of FIGS. 13-18, the geometry and relative dimensions of the radius $RP_R$ of the arcuate inner surfaces 178, 188 (as well as radius $RP_{R1}$ and radius $RP_{R2}$ of any of the applicable embodiments of FIGS. 4-10), the root protrusion height $RP_H$ (as well as root protrusion height $RP_{H1}$ of any of the applicable alternative embodiments of FIGS. 4-10), and the width RPw of the of the root protrusion 22 of the first structural member 10 and the root protrusion 32 of the second structural member 12 of any embodiments as disclosed and illustrated herein are selected and configured to define, form, locate, and isolate the weld root 72 within a stress protected weld root region 160 outward, beyond, below, and away from the root stress flow path 200, which corresponds with and can be defined as a negligible root stress region ($N_{SR}$) within which or to which little or no appreciable fatigue inducing stress forces are applied, propagated, experienced, or transferred. The geometry and/or relative dimensions of any of the root protrusions 22, 32 as disclosed herein, including any one or more of the radius $RP_R$, $RP_{R1}$ and $RP_{R2}$ of the arcuate inner surfaces, the root protrusion height $RP_H$, $RP_{H1}$, and the width RPw of the of the root protrusion 22 and/or the root protrusion 32 of the first and/or second structural members 10, 12, can be selected and configured to define, form, locate, and isolate the weld root 72 within a stress protected weld root region 160 which corresponds with and can be defined as a negligible root stress region ($N_{SR}$) located outward, beyond, below, and away from the root stress flow path 200 in a number of ways based upon any one or more of a variety of considerations, characteristics, or variables, which may include, in part, the thickness of one or more of the first and second structural members 10, 12. In one non-limiting example, the geometry and relative dimensions of any one or more of the root protrusions 22, 32 of the structural members 5, 10, 12 as disclosed herein, including those shown in any one or more of the embodiments of FIGS. 1-10, can include a root protrusion width, RPw, which may be less than or equal to the thickness $T_1$, $T_2$ of the respective structural member 10, 12 corresponding therewith, (($RPw \leq (T_1$ or $T_2)$)); a root protrusion height, $RP_H$, which may be greater than or equal to the root protrusion width, RPw, of the corresponding root protrusion 22, 32 by a factor of 1.1, ($RP_H \geq 1.1*RPw$); and a root protrusion radius, $RP_R$, which may be less than or equal to the root protrusion height, $RP_H$, of the corresponding root protrusion 22, 32, by a factor of two (2), ($RP_R \leq 2*RP_H$).

In yet another non-limiting, alternative example, the geometry and relative dimensions of any one or more of the root protrusions 22, 32 of the structural members 5, 10, 12 as disclosed herein, including those shown in any one or more of the embodiments of FIGS. 1-10, may include a root protrusion width, RPw, which may be less than or equal to the thickness $T_1$, $T_2$ of the respective structural member 10, 12 corresponding therewith, (($RPw \leq (T_1$ or $T_2)$)); a root protrusion height, $RP_H$, which may be greater than or equal to the root protrusion width, RPw, of the corresponding root protrusion 22, 32 by a factor of 1.2, ($RP_H \geq 1.2*RPw$); and a root protrusion radius, $RP_R$, which may be less than or equal to the root protrusion height, $RP_H$, of the corresponding root protrusion 22, 32, by a factor of three (3), ($RP_R \leq 3*RP_H$).

In a still further non-limiting, alternative example, the geometry and relative dimensions of any one or more of the root protrusions 22, 32 of the structural members 5, 10, 12 as disclosed herein, including those shown in any one or more of the embodiments of FIGS. 1-10, may include a root protrusion width, RPw, which may be less than or equal to the thickness $T_1$, $T_2$ of the respective structural member 10, 12 corresponding therewith, (($RPw \leq (T_1$ or $T_2)$)); a root protrusion height, $RP_H$, which may be greater than or equal to the root protrusion width, RPw, of the corresponding root protrusion 22, 32, ($RP_H \geq RPw$); and a root protrusion radius, $RP_R$, which may be less than or equal to the root protrusion height, $RP_H$, of the corresponding root protrusion 22, 32, ($RP_R \leq RP_H$).

In yet another non-limiting example, the geometry and relative dimensions of any one or more of the root protrusions 22, 32 of the structural members 5, 10, 12 as disclosed herein, including those shown in any one or more of the embodiments of FIGS. 1-10, may include a root protrusion width, RPw, which may be less than or equal to the thickness $T_1$, $T_2$ of the respective structural member 10, 12 corresponding therewith for structural members 10, 12 which have a thickness $T_1$, $T_2$ of less than five (5) millimeters, and may include a root protrusion width, RPw, which may be less than or equal to two thirds (⅔) the thickness $T_1$, $T_2$ of the respective, corresponding structural member 10, 12 for structural members 10, 12 which have a thickness $T_1$, $T_2$ which is greater than or equal to five (5) millimeters, ((For $T_1$, $T_2 \leq 5$ mm: ($RPw \leq (T_1$ or $T_2)$)) and (For $T_1$, $T_2 \leq 5$ mm: ($RPw \leq (⅔)*(T_1$ or $T_2)$))); a root protrusion height, $RP_H$, which may be greater than or equal to the root protrusion width, RPw, of the corresponding root protrusion 22, 32 by a factor of one and a half (1.5) for structural members 10, 12 which have a thickness $T_1$, $T_2$ of less than five (5) millimeters, and a root protrusion height, $RP_H$, which may be greater than or equal to the root protrusion width, RPw, of the corresponding root protrusion 22, 32 for structural members 10, 12 which have a thickness $T_1$, $T_2$ which is greater than or equal to five (5) millimeters, ((For $T_1$, $T_2 \leq 5$ mm: ($RP_H \geq 1.5*RPw$)) and (For $T_1$, $T_2 \geq 5$ mm: ($RP_H \geq RPw$))); and a root protrusion radius, $RP_R$, which may be less than or equal to the root protrusion height, $RP_H$, of the corresponding root protrusion 22, 32, by a factor of three (3) for structural members 10, 12 which have a thickness $T_1$, $T_2$ of less than five (5) millimeters, and a root protrusion radius, $RP_R$, which may be less than or equal to the root protrusion height, $RP_H$, of the corresponding root protrusion 22, 32, by a factor of two (2) for structural members 10, 12 which have a thickness $T_1$, $T_2$ which is greater than or equal to five (5) millimeters, ((For $T_1$, $T_2 \leq 5$ mm: ($RP_R \leq 3*RP_H$)) and (For $T_1$, $T_2 \leq 5$ mm: $RP_R \leq 2*RP_H$))).

In a further non-limiting, alternative example, the geometry and relative dimensions of any one or more of the root protrusions 22, 32 of the structural members 5, 10, 12 as disclosed herein, including those shown in any one or more of the embodiments of FIGS. 1-10, may include a root protrusion width, RPw, which may be less than or equal to half (½) the thickness $T_1$, $T_2$ of the respective structural member 10, 12 corresponding therewith, (($RPw \leq 0.5*(T_1$ or $T_2)$); a root protrusion height, $RP_H$, which may be greater than or equal to the root protrusion width, RPw, of the corresponding root protrusion 22, 32, by a factor of 1.2, ($RP_H \geq 1.2*RPw$); and a root protrusion radius, $RP_R$, which may be less than or equal to the root protrusion height, $RP_H$, of the corresponding root protrusion 22, 32, ($RP_R \leq RP_H$).

As provided above, each of the foregoing non-limiting examples can apply to the geometry and relative dimensions of any one or more of the root protrusions 22, 32 of the structural members 5, 10, 12 as disclosed herein, including those shown in any one or more of the embodiments of FIGS. 1-10, and as such, although the geometries and relative dimensions are discussed with respect to root protrusion width, RPw, root protrusion height, $RP_H$, and root protrusion radius, $RP_R$, the foregoing examples can apply equally to, can include, and can use (or can be substituted with) the protrusions 22, 32 of any one or more of the embodiments of FIGS. 4-10 as well as each respective root protrusion width, RPw, root protrusion height, $RP_H$, $RP_{H1}$, and root protrusion radius, $RP_R$, $RP_{R1}$, $RP_{R2}$ of any one or more of the root protrusions 222 ($RP_{H1}$, $RP_{R1}$), 322 ($RP_{H1}$), 422, 522 ($RP_{H1}$, $RP_{R1}$), 622 ($RP_{R1}$), 632 ($RP_{R2}$), and/or 722 ($RP_{H1}$, $RP_{R1}$) of the embodiments of FIGS. 4-10, as follows: First non-limiting example: (($RPw \leq (T_1$ or $T_2$)); ($RP_H$ (or $RP_{H1}$)$\geq 1.1 \times RPw$); ($RP_R$ (or $RP_{R1}$ or $RP_{R2}$)$\leq 2*RP_H$ (or $RP_{H1}$)); Second non-limiting example: (($RPw \leq (T_1$ or $T_2$)); ($RP_H$ (or $RP_{H1}$)$\geq 1.2*RPw$); ($RP_R$ (or $RP_{R1}$ or $RP_{R2}$)$\leq 3*RP_H$ (or $RP_{H1}$)); Third non-limiting example: (($RPw \leq (T_1$ or $T_2$)); ($RP_H$ (or $RP_{H1}$)$\geq RPw$); ($RP_R$ (or $RP_{R1}$ or $RP_{R2}$)$\geq RP_H$ (or $RP_{H1}$)); Fourth non-limiting example: ((For $T_1$, $T_2 < 5$ mm: ($RPw \leq (T_1$ or $T_2$))) and (For $T_1$, $T_2 \geq 5$ mm: ($RPw \leq (⅔)*(T_1$ or $T_2$)))); ((For $T_1$, $T_2 < 5$ mm: ($RP_H$ (or $RP_{H1}$)$\geq 1.5*RPw$)) and (For $T_1$, $T_2 \geq 5$ mm: ($RP_H$ (or $RP_{H1}$)$\geq RPw$))); ((For $T_1$, $T_2 < 5$ mm: ($RP_R$ (or $RP_{R1}$ or $RP_{R2}$)$\leq 3*RP_H$ (or $RP_{H1}$))) and (For $T_1$, $T_2 \geq 5$ mm: $RP_R$ (or $RP_{R1}$ or $RP_{R2}$)$\leq 2*RP_H$ (or $RP_{H1}$)))); Fifth non-limiting example: (($RPw \leq (0.5)*(T_1$ or $T_2$)); ($RP_H$ (or $RP_{H1}$)$\geq 1.2*RPw$); ($RP_R$ (or $RP_{R1}$ or $RP_{R2}$)$\leq RP_H$ (or $RP_{H1}$)).

In yet another non-limiting example, the geometry of the root protrusions 22, 32, may be configured to include a geometry and orientation such that the root protrusions 22, 32 are oriented generally perpendicular to the orientations of the main bodies 41, 241 of the respective first and second structural members 10, 12, such as generally perpendicular to the central medial axes 60, 160 and/or the terminal ends of the second surfaces 18, 78 of the respective first and second structural members 10, 12 within the respective end portions 20, 30. For the purposes of the present example, "generally perpendicular" means and includes that although certain surfaces of the root protrusions 22, 32 may be oriented at various angles, may be curved, and/or may include orientations or shapes which may not be perpendicular to the above-discussed axes or surfaces of the respective first and second structural members 10, 12, the various individual surfaces may combine to form an overall orientation of the root protrusions 22, 32, as a whole, as perpendicular with reference to any one or more of the above-discussed axes or surfaces. The foregoing non-limiting example may also include that the generally perpendicular orientation of the root protrusions 22, 32 may be defined as including a radius $RP_R$, $RP_{R1}$ and $RP_{R2}$ of the arcuate inner surfaces 188 (and/or any one or more of 278, 278a, 578, 678, 878), 188 (and/or 788) which may be an acute radius. For the purposes of the present example, "acute radius" means and includes any radius $RP_R$, $RP_{R1}$ or $RP_{R2}$ which defines and/or orients the protrusions 22, 32 as being "generally perpendicular" consistent with the foregoing disclosure.

It should be appreciated that the foregoing represent non-limiting examples, and no one or more of the above non-limiting examples should be construed as limiting or as a required embodiment to the exclusion of other differing embodiments or examples which may be equally applicable or which may include other configurations, geometries, or features which may be applicable to differing considerations, characteristics, or variables.

Figure 19:
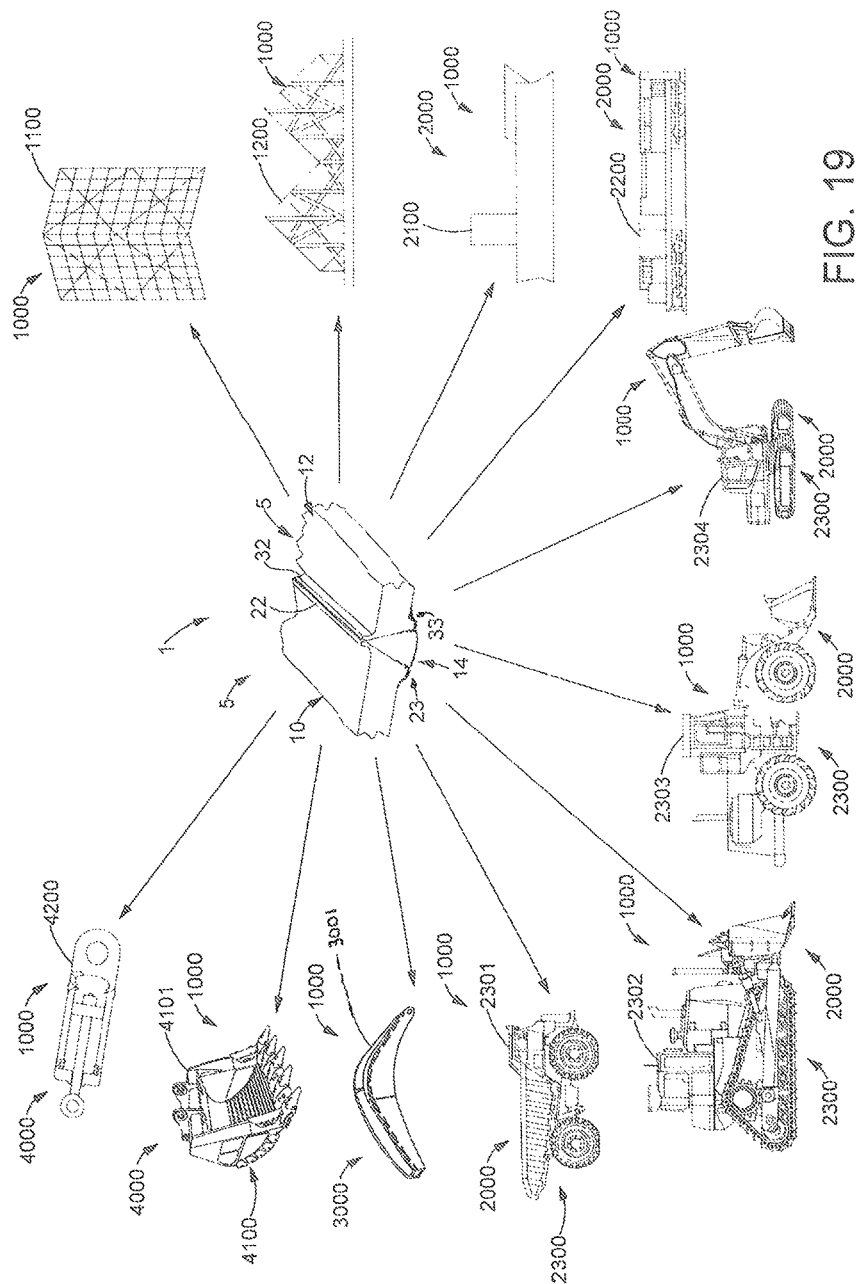
FIG. 19 is a diagrammatic view of the various structures into which the structure could be incorporated in accordance with the present disclosure.

As discussed above, the present disclosure is directed to any structure 1 composed of at least two structural members 5 joined by at least one groove weld according to any one or more of the embodiments disclosed herein. Referring to FIG. 19, the structure 1 composed of at least two structural members 5, illustrated as first structural member 10 and second structural member 12, and the root protrusions 22, 32 (as well as toe protrusions 23, 33) thereof, joined by at least one groove weld 14 according to any one or more of the embodiments disclosed herein can be used to form and be incorporated into any of a variety of structures or portions thereof which include at least one groove weld. FIG. 19 illustrates non-limiting examples of a variety of overall structures (having at least one groove weld) 1000 which can be formed by, and/or into which the structure 1, including the first and second structural members 10, 12 and root protrusions 22, 32 and/or toe protrusions 23, 33, thereof and joined by the at least one groove weld 14, can be incorporated according to any one or more of the embodiments disclosed herein can be incorporated. The structures (having at least one groove weld) 1000 which can be formed by and/or into which the structure 1 can be incorporated can include one or more of a building structure 1100 and a bridge truss structure 1200. The overall structures (having at least one groove weld) 1000 which can include the structure 1 can also include any mobile machine 2000, such as, and including any one or more of a marine vessel 2100, a locomotive 2200, and any construction machine 2300, such as, and including any one or more of an off highway truck 2301, track type tractor 2302 and wheel loader 2303, and an excavator 2304. The structure 1 including the first and second structural members 10, 12 and root protrusions 22, 32 thereof joined by the at least one groove weld 14 can further be used to form overall structures (having at least one groove weld) 1000 which can include a machine structure 3000 (one example of which is described and illustrated in FIG. 20), as well as any replaceable part or component 4000, which can include a work tool 4100 (such as a bucket 4101) as well as a hydraulic cylinder 4200 (such as that described and illustrated in FIG. 21).

FIG. 20 illustrates yet another an example of an overall structure (having at least one groove weld) 1000 incorporating the structure 1 including two or more structural members 5 joined by at least one groove weld 14 including any one or more of the protected geometries and features according to any one or more of the embodiments as disclosed herein is incorporated into and forms a machine structure 3000 as shown in FIG. 19. In particular, overall structure (having at least one groove weld) 1000 is a machine structure 3000 formed, at least in part, by structure 1 including two or more structural members 5 joined by at least one groove weld 14, which is embodied as a machine structure 3000 of a construction machine 2300, shown, in the present example, as a boom structure 3001 of an excavator 2304. The structural members 5 of the boom structure 3001 may include two or more side, lateral, or outer structural panel or plate members 3010a and 3012a joined by groove weld 3014a, as well as side, lateral, or outer structural panel or plate members 3010b and 3012b joined by groove weld 3014b. The structural members 5 of the boom structure 3001 may also include two or more inner structural panel or plate members 3110 and 3112 joined by groove weld 3114, wherein the two or more inner structural panel or plate members 3110 and 3112 are joined to and extend between inner or inwardly facing first surfaces 3016a, 3076a and 3016b and 3076b of the outer structural plate members 3010a, 3012a and 3010b and 3012b. As shown in FIG. 20, (and referencing FIGS. 1-3) groove welds 3014a, 3014b join end portions 20, 30 of the first and second structural members 10, 12 embodied as outer structural plate members 3010a, 3012a and 3010b and 3012b having root protrusions 3022a, 3032a and 3022b and 3032b extending outward from outer or outwardly facing second surfaces 3018a, 3078a and 3018b and 3078b of the outer structural plate members 3010a, 3012a and 3010b and 3012b to define an outer rib or seam 3015a, 3015b protruding outward from the interface between the outwardly facing second surfaces 3018a, 3078a and 3018b and 3078b which form the outer or exterior surface of the boom structure 3001. As shown in FIG. 20, (and referencing FIGS. 1-3 as well as FIG. 12) groove weld 3114 joins end portions 20, 30 of the first and second structural members 10, 12 embodied as inner structural panel or plate members 3110 and 3112 having both root protrusions 3122, 3132 extending outward from inner or downwardly facing second surfaces 3118, 3178 as well as toe protrusions 3123, 3133 extending outward from outer or upwardly facing first surfaces 3116, 3176 of the inner structural panel or plate members 3110 and 3112.

Figure 21:
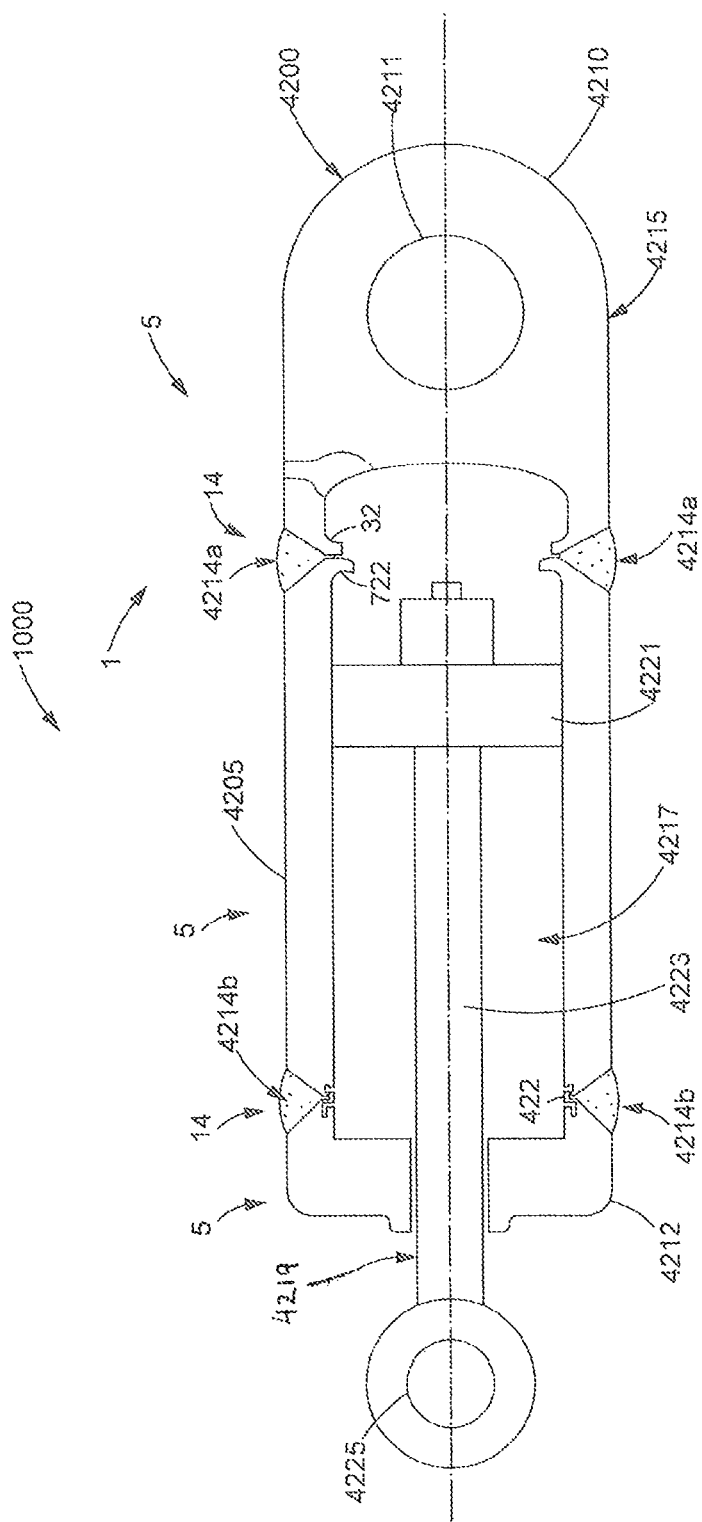
FIG. 21 is a cross-sectional view of an exemplary overall structure having at least one groove weld illustrated as hydraulic cylinder incorporating the structure including two or more structural members joined by at least one groove weld according to the present disclosure.

FIG. 21 illustrates an example of an overall structure (having at least one groove weld) 1000 incorporating the structure 1 including two or more structural members 5 joined by at least one groove weld 14 wherein the structure 1 is embodied as a tubular or cylindrical structure including two or more tubular or cylindrical structural members 5 joined by at least one groove weld 14 including any one or more of the protected geometries and features according to any one or more of the embodiments as disclosed herein. In the present example, the overall structure (having at least one groove weld) 1000 which is formed, at least in part, by structure 1 including two or more structural members 5 joined by at least one groove weld 14, is embodied as a hydraulic cylinder 4200 as shown in FIG. 19. The structural members 5 of the hydraulic cylinder 4200 include a cylinder 4205, a cylinder housing end cap 4210 including a cylinder eye 4211, and rod end cap 4212 to form a cylinder housing 4215, wherein the cylinder 4205 is joined to the cylinder housing end cap 4210 via a first groove weld 4214a, and rod end cap 4212 is joined to the cylinder 4205 via a second groove weld 4214b, to define a hollow interior 4217 therein which receives a piston and rod assembly 4219 configured for linear translational motion therein. The piston and rod assembly 4219 includes a piston head 4221 retained within the hollow interior 4217 of the cylinder housing 4215, a piston rod 4223 connected to the piston head 4221 within the hollow interior 4217 and extending linearly outward from the hollow interior 4217 of the cylinder housing 4215 via an opening disposed through the rod end cap 4212 to a piston eye 4225 connected to the piston rod 4223 on an end of the piston and rod assembly 4219 opposite the piston head 4221. As provided above, the tubular or cylindrical structure, shown by way of example as cylinder housing 4215, can include tubular or cylindrical structural members 5 joined by one groove weld 14, or multiple groove welds 14, shown for the purposes of illustration as first and second groove welds 4214a, 4214b, which can include any one or more of the protected geometries and features according to any one or more of the embodiments as disclosed herein. In the present exemplary embodiment, the first groove weld 4214a which joins the cylinder 4205 to the cylinder housing end cap 4210 via a first groove weld 4214a may be embodied consistent with the example as shown and discussed in FIGS. 10 & 11 herein, wherein one or more of the end portions 20, 30 of the structural members 5 embodied as the cylinder 4205 and the cylinder housing end cap 4210 may include the arcuate root protrusion 722. The second groove weld 4214b which joins the rod end cap 4212 and the cylinder 4205 as illustrated in the exemplary embodiment of FIG. 20 may be embodied consistent with the example as shown and discussed in FIGS. 10 & 11 herein, wherein one of the end portions 20, 30 of the structural members 5 embodied as the rod end cap 4212 and the cylinder 4205 may include the root extension protrusion 422 shown in the embodiment of FIG. 7 which may be particularly suitable for cylindrical structures and other applications given that the second groove weld 4214b includes the geometries and features of the root protrusions 422, 32 such that the weld root 72 is positioned within the stress protected weld root region 160 and isolated beyond and away from the root stress flow path 200 according to the present disclosure, but includes the root protrusion end surface extension 482 as an additional structure to enable a smooth, continuous interface between the adjacent structural members 5.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A structural member, comprising:
    a body including a first surface, a second surface, and an end surface at an end portion of the structural member;
    the end portion of the structural member including a root protrusion extending radially outward from the second surface of the structural member along a root protrusion radius to an outer end of the root protrusion to define a root protrusion height extending from the second surface of the structural member to the outer end of the root protrusion; and
a root protrusion width extending between an inner edge and an outer edge of the outer end of the root protrusion,
wherein the root protrusion radius, the root protrusion height, and the root protrusion width are configured to define a stress protected weld root region isolated beyond and away from a root stress flow path propagated through the body of the structural member,
wherein the end surface at the end portion of the structural member extends from a first end interface between the first surface and the end surface to a second end interface between the end surface and a bottom of the root protrusion, and wherein the second end interface is beyond the second surface in a direction of the root protrusion height,
wherein a thickness of the body is greater than the root protrusion height,
wherein the thickness of the body is greater than the root protrusion width, and
wherein the root protrusion radius is less than or equal to twice the root protrusion height.

2. The structural member of claim 1, wherein the root protrusion width at the outer end of the root protrusion is a non-zero value greater than a convergent edge.

3. The structural member of claim 1, wherein the root protrusion radius is less than or equal to twice the root protrusion height.

4. The structural member of claim 1, wherein the thickness of the body is greater than or equal to 5 mm.

5. The structural member of claim 1, wherein the body of the structural member includes the root protrusion and a main body of the structural member.

6. The structural member of claim 5, wherein the main body of the structural member includes any one or more of planar, arcuate, cylindrical, concave, convex, and incurvate shape.

7. The structural member of claim 5, wherein the main body of the structural member is tubular.

8. A structural member, comprising:
a body including a first surface, a second surface, and an end surface at an end portion of the structural member;
the end portion of the structural member including a root protrusion extending radially outward from the second surface of the structural member along a root protrusion radius to an outer end of the root protrusion to define a root protrusion height extending from the second surface of the structural member to the outer end of the root protrusion; and
a root protrusion width extending between an inner edge and an outer edge of the outer end of the root protrusion,
wherein the root protrusion radius, the root protrusion height, and the root protrusion width are configured to define a stress protected weld root region isolated beyond and away from a root stress flow path propagated through the body of the structural member,
wherein the end surface at the end portion of the structural member extends from a first end interface between the first surface and the end surface to a second end interface between the end surface and a bottom of the root protrusion, and wherein the second end interface is beyond the second surface in a direction of the root protrusion height, and wherein:
a thickness of the body is greater than or equal to 5 mm, the root protrusion width is less than the thickness of the body, the root protrusion height is greater than or equal to the root protrusion width, and the root protrusion radius is less than or equal to twice the root protrusion height, or
the root protrusion width is less than or equal to half the thickness of the body, the root protrusion height is greater than or equal to the root protrusion width, and the root protrusion radius is less than or equal to the root protrusion height.

9. The structural member of claim 8, wherein the root protrusion width at the outer end of the root protrusion is a non-zero value greater than a convergent edge.

10. The structural member of claim 8, wherein the root protrusion radius is less than or equal to twice the root protrusion height.

11. The structural member of claim 8, wherein the body of the structural member includes the root protrusion and a main body of the structural member.

12. The structural member of claim 11, wherein the main body of the structural member includes any one or more of planar, arcuate, cylindrical, concave, convex, and incurvate shape.

13. The structural member of claim 11, wherein the main body of the structural member is tubular.

14. A structure, comprising:
at least two structural members joined by at least one groove weld, the at least two individual structural members including a first structural member and a second structural member independent of the first structural member;
each of the first structural member and the second structural member including:
a body including a first surface, a second surface, and an end surface at an end portion;
the end portion including a root protrusion extending radially outward from the second surface along a root protrusion radius to an outer end of the root protrusion to define a root protrusion height extending from the second surface to the outer end of the root protrusion; and
a root protrusion width extending between an inner edge and an outer edge of the outer end of the root protrusion,
wherein the root protrusion radius, the root protrusion height, and the root protrusion width of the root protrusion of the first structural member and the root protrusion of the second structural member are configured to locate a weld root within a stress protected weld root region which corresponds to a negligible root stress concentration zone isolated beyond and away from a root stress flow path propagated through the body of the first structural member and the body of the second structural member such that fatigue failure does not occur in the weld root,
wherein, for the body of each of the first and second structural members, the end surface at the end portion extends from a first end interface between the first surface and the end surface to a second end interface between the end surface and a bottom of the root protrusion, and wherein the second end interface is beyond the second surface in a direction of the root protrusion height,
wherein the weld roots extend no further than the outer ends of the root protrusions of the first and second structural members, and wherein for each of the first and second structural members:
- a thickness of the body is greater than the root protrusion height,
- the thickness of the body is greater than the root protrusion width,
- the root protrusion radius is less than or equal to twice the root protrusion height, and
- the root protrusion width at the outer end of the root protrusion is a non-zero value greater than a convergent edge.

15. The structure of claim 14, wherein for each of the first and second structural members the end surface at the end portion of the structural member is chamfered, and wherein a width of the chamfered end surface is greater than the root protrusion width such that an end of the chamfered end surface at the first surface overlaps the second surface in a thickness direction of the structural member.

16. The structure of claim 14, wherein for each of the first and second structural members the body of the structural member includes the root protrusion and a main body of the structural member.

17. The structure of claim 16, wherein the main body of the structural member includes any one or more of planar, arcuate, cylindrical, concave, convex, and incurvate shape.

18. The structure of claim 16, wherein the main body of the structural member is tubular.

* * * * *